United States Patent [19]

Kannapell et al.

[11] Patent Number: 4,577,235

[45] Date of Patent: Mar. 18, 1986

[54] TEXT/CONTINUOUS TONE IMAGE DECISION PROCESSOR

[75] Inventors: Henry N. Kannapell, Raleigh, N.C.; Paul G. Nietfeld, San Antonio, Tex.

[73] Assignee: The Mead Corporation, Dayton, Ohio

[21] Appl. No.: 642,605

[22] Filed: Aug. 20, 1984

[51] Int. Cl.[4] .............................................. H04N 1/40
[52] U.S. Cl. ..................... 358/280; 358/282; 358/283; 382/52
[58] Field of Search ................... 358/280, 282, 283; 382/54, 50, 51, 52, 53, 9, 27

[56] References Cited

U.S. PATENT DOCUMENTS

| | | | |
|---|---|---|---|
| 3,737,855 | 6/1973 | Cutaia | 382/54 |
| 3,952,144 | 4/1976 | Kolker | 358/282 |
| 4,194,221 | 3/1980 | Stoffel | 358/283 |
| 4,196,453 | 4/1980 | Warren | 358/283 |
| 4,196,454 | 4/1980 | Warren | 358/283 |
| 4,210,936 | 7/1980 | Cinque et al. | 358/283 |
| 4,245,258 | 1/1981 | Holladay | 358/283 |
| 4,251,837 | 2/1981 | Janeway, III | 358/280 |
| 4,259,694 | 3/1981 | Liao | 358/283 |
| 4,280,144 | 7/1981 | Bacon | 358/280 |
| 4,326,258 | 4/1982 | de la Guardia | 358/282 |
| 4,328,426 | 5/1982 | D'Ortenzio | 280/578 |
| 4,339,774 | 7/1982 | Temple | 358/283 |
| 4,345,314 | 8/1982 | Melamud et al. | 358/282 |
| 4,349,846 | 9/1982 | Sekigawa | 358/283 |
| 4,400,738 | 8/1983 | Tomory et al. | 358/283 |
| 4,403,257 | 9/1983 | Hsieh | 358/283 |

*Primary Examiner*—Edward L. Coles, Sr.
*Attorney, Agent, or Firm*—Biebel, French & Nauman

[57] ABSTRACT

Grayscale image data obtained by scanning a document to be duplicated is partitioned into contiguous image data blocks which are processed to determine whether the portions of the image represented by the data blocks correspond to text or continuous tone portions of the document. An average grayscale value is determined for each data block and used as an indexing variable for at least one additional characteristic determined for the block. Disclosed additional characteristics include a block variance, a block edge count, a block agreement count and a block text average. A one dimensional Gaussian distribution is generated to distribute the data values of any additional characteristics for each possible grayscale value of a block. The mean and standard deviation are determined for each data distribution and the Mahalanobis distance for each characteristic data value is determined. The Mahalanobis distance is a representative probability for whether the image data block corresponds to a text portion of the image or a continuous tone portion of the image.

20 Claims, 17 Drawing Figures

| 1 | 11 | 21 | 31 | 41 | 51 | 61 | 71 | 81 | 91 |
|---|---|---|---|---|---|---|---|---|---|
| 2 | 12 | 22 | 32 | 42 | 52 | 62 | 72 | 82 | 92 |
| 3 | 13 | 23 | 33 | 43 | 53 | 63 | 73 | 83 | 93 |
| 4 | 14 | 24 | 34 | 44 | 54 | 64 | 74 | 84 | 94 |
| 5 | 15 | 25 | 35 | 45 | 55 | 65 | 75 | 85 | 95 |
| 6 | 16 | 26 | 36 | 46 | 56 | 66 | 76 | 86 | 96 |
| 7 | 17 | 27 | 37 | 47 | 57 | 67 | 77 | 87 | 97 |
| 8 | 18 | 28 | 38 | 48 | 58 | 68 | 78 | 88 | 98 |
| 9 | 19 | 29 | 39 | 49 | 59 | 69 | 79 | 89 | 99 |
| 10 | 20 | 30 | 40 | 50 | 60 | 70 | 80 | 90 | 100 |

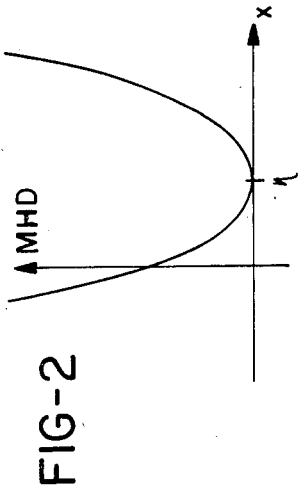
FIG-2
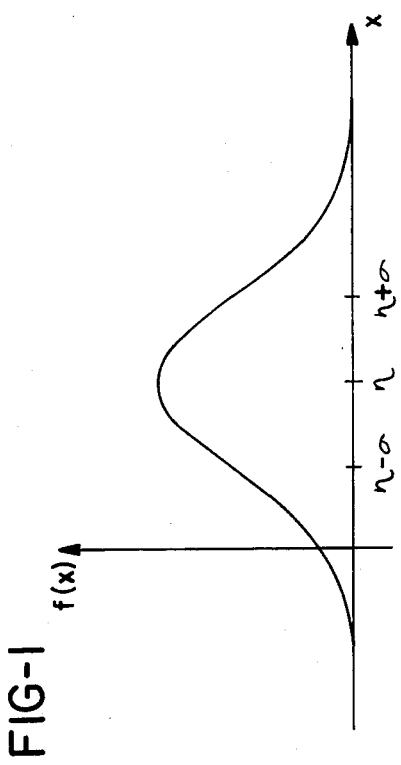
FIG-1
FIG-3A
FIG-3B

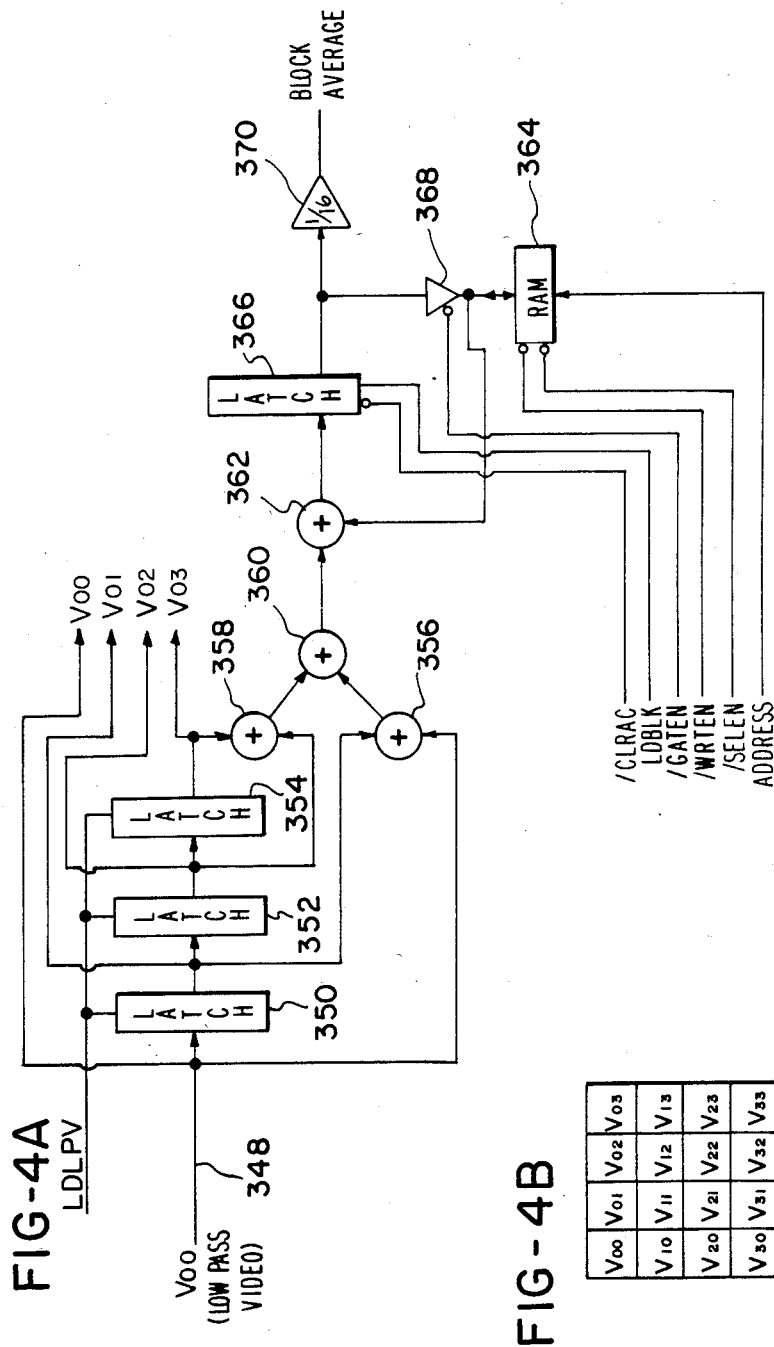

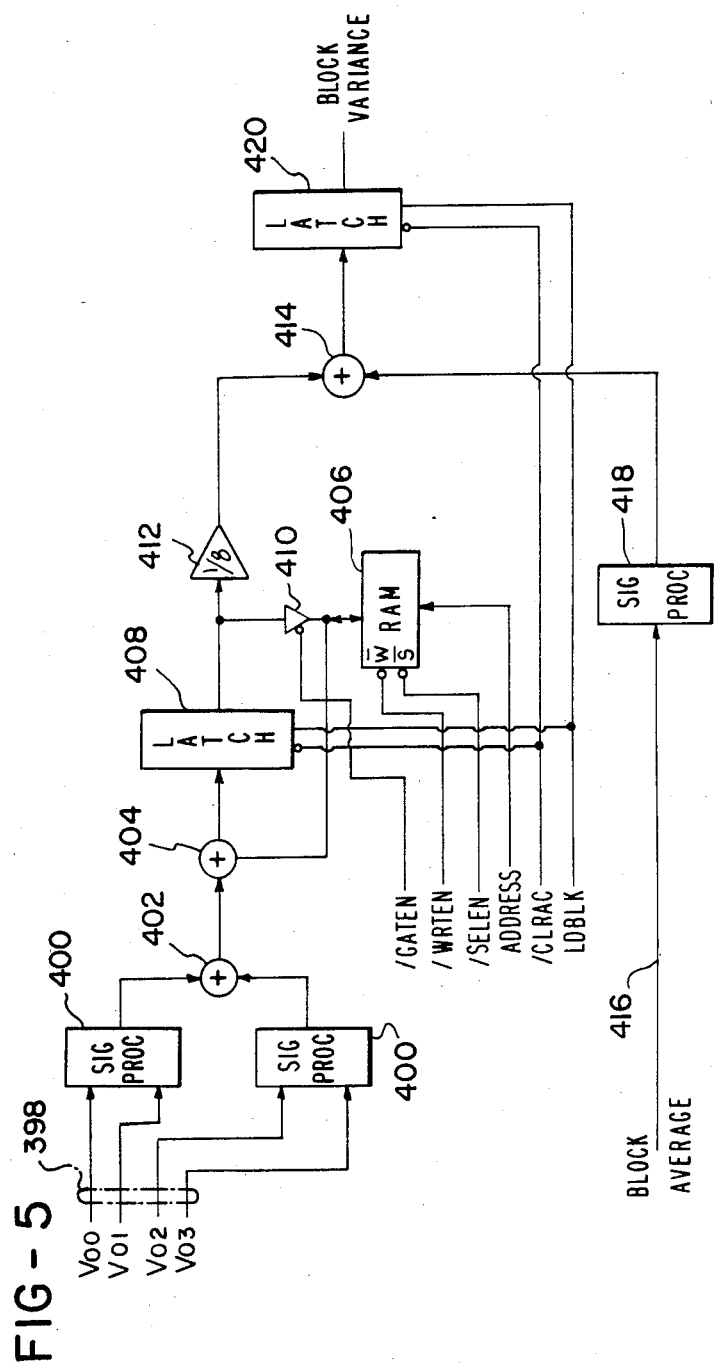

| 1 | 11 | 21 | 31 | 41 | 51 | 61 | 71 | 81 | 91 |
|---|----|----|----|----|----|----|----|----|----|
| 2 | 12 | 22 | 32 | 42 | 52 | 62 | 72 | 82 | 92 |
| 3 | 13 | 23 | 33 | 43 | 53 | 63 | 73 | 83 | 93 |
| 4 | 14 | 24 | 34 | 44 | 54 | 64 | 74 | 84 | 94 |
| 5 | 15 | 25 | 35 | 45 | 55 | 65 | 75 | 85 | 95 |
| 6 | 16 | 26 | 36 | 46 | 56 | 66 | 76 | 86 | 96 |
| 7 | 17 | 27 | 37 | 47 | 57 | 67 | 77 | 87 | 97 |
| 8 | 18 | 28 | 38 | 48 | 58 | 68 | 78 | 88 | 98 |
| 9 | 19 | 29 | 39 | 49 | 59 | 69 | 79 | 89 | 99 |
| 10 | 20 | 30 | 40 | 50 | 60 | 70 | 80 | 90 | 100 |

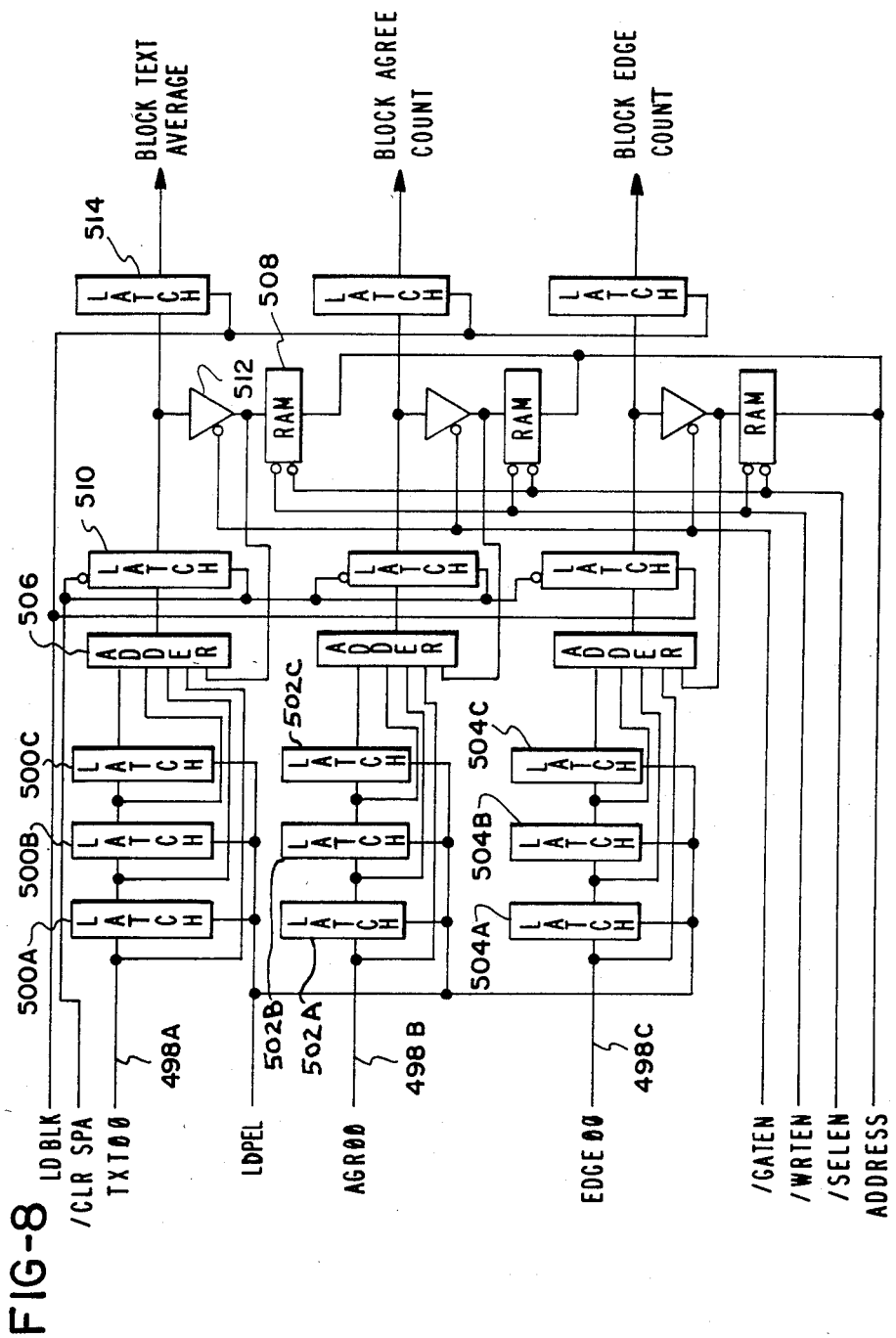

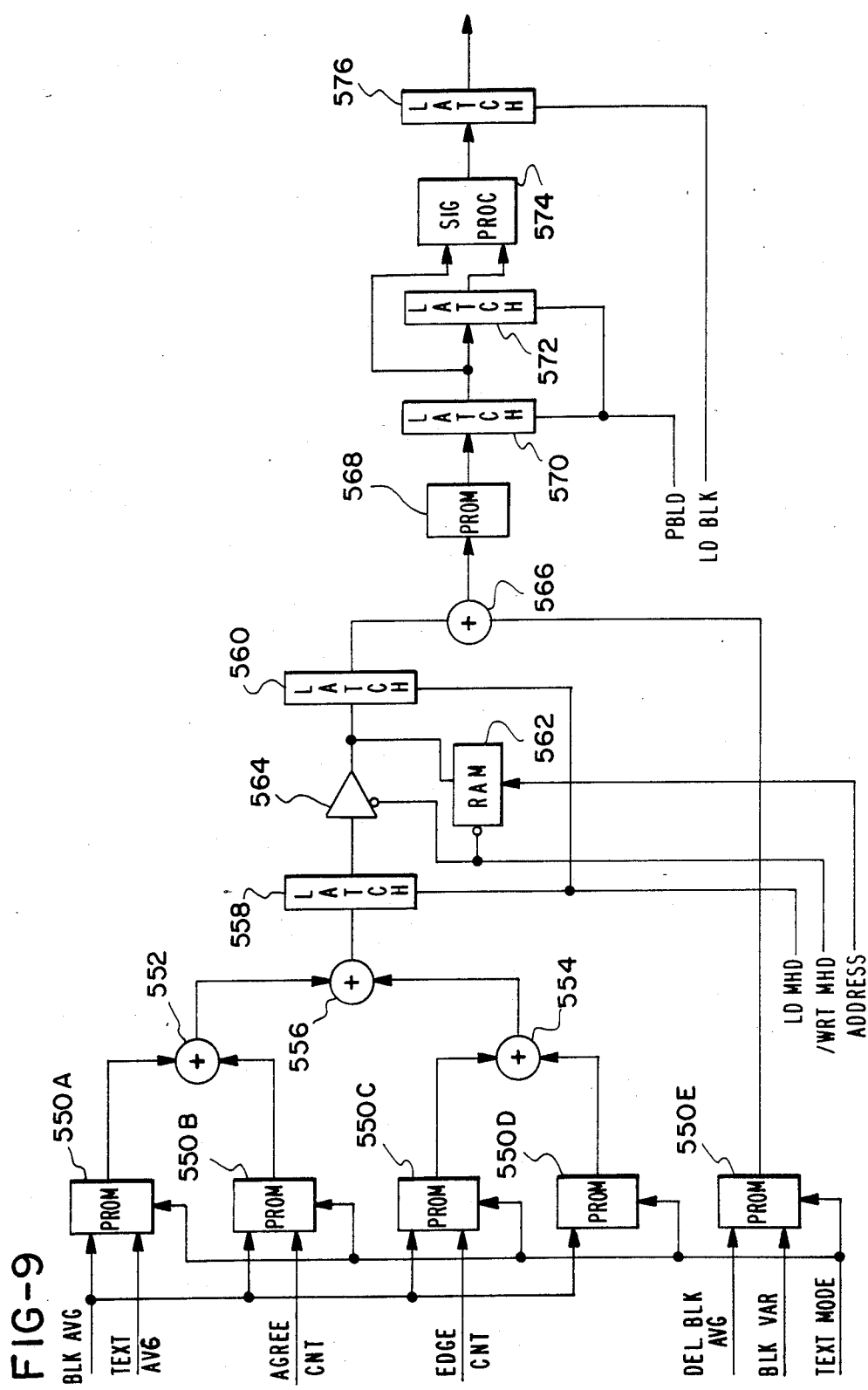

TEXT/CONTINUOUS TONE IMAGE DECISION PROCESSOR

BACKGROUND OF THE INVENTION

This invention relates generally to processing image data obtained by scanning a picture, document or other image and, more particularly, to determining whether portions of the image represented by the image data correspond to text or continuous tone such that the image data may be appropriately processed for storage, duplication or display of the image.

Image data is obtained by scanning an image with a scanner comprising, for example, a plurality of charge coupled devices (CCD's). The scanner effectively divides the image into a finite number of small picture elements which are referred to as pixels or pels. Each resulting pel of the image is converted into a number representative of the grayscale value of the pel as detected by one of the scanner CCD's.

The image data is often applied to a bilevel device, i.e., a device which reproduces each pel as one of two grayscale levels, typically black or white, for duplication or display of the image. For application in a bilevel device, the image data representative of each pel is processed into a binary number signifying whether the pel is to be black or white, e.g., a print or no print picture element, respectively, for an image duplication system. The determination of which pels of image data are to be printed or left not printed for a bilevel image duplication system depends to some extent on the characteristics of the image to be duplicated.

For example, portions of the image may be broadly classified as comprising either continuous tone or text. Photographs and certain half tone images are examples of continuous tone while text is exemplified by line drawings and letter images. Different techniques are normally applied to process the two different types of image data.

For text image data, the conversion from grayscale values to binary values is often accomplished by establishing a threshold to which the grayscale value of each pel is compared. The result of the comparison is that if the grayscale value exceeds the threshold, a black or print representation is selected for the pel and, conversely, if the threshold is not exceeded, the pel is left white or not printed.

For continuous tone image data, alternate techniques are applied. For example, a variety of pel block patterns may be selected to represent blocks of the continuous tone image data dependent upon the composite grayscale value of the blocks. For continuous tone image data, pel block patterns may be shifted, rotated or otherwise varied to prevent the appearance of interference patterns such as Moiré patterns.

One known prior art technique for distinguishing between text and continuous tone image data employs an electronic filter. The filter is applied to a block of pel data surrounding a particular pel to be evaluated. The difference between the grayscale value of the pel being evaluated and the average filtered grayscale value for the block of pels is determined. If the absolute value of the difference is above a preset threshold, text image data is presumed; and, if the absolute value of the difference is below or equal to the preset threshold, continuous tone image data is presumed. This technique is more fully disclosed in U.S. Pat. No. 4,194,221.

While the known prior art arrangement provides a varying level of effectiveness dependent upon the selection of coefficients for use in the electronic filter, improved techniques for distinguishing between text and continuous tone image data are always needed to advance the art of image processing and provide effective and inexpensive alternatives.

SUMMARY OF THE INVENTION

In accordance with the present invention, image data is partitioned into contiguous image data blocks which are processed to determine whether the portions of the image represented by the data blocks correspond to text or continuous tone portions of the image. An average grayscale value is determined for each of the image data blocks with the average grayscale value being used as an indexing variable for at least one additional characteristic which is determined for each of the image data blocks. A one dimensional Gaussian distribution is generated to distribute the data values of the one or more additional characteristics for each possible grayscale value of an image data block. The mean and standard deviation are determined for each data distribution and the Mahalanobis distance for each additional characteristic data value is determined. The Mahalanobis distance effectively measures the distance of the data value from the mean of the distribution for the characteristic of the corresponding data block and, hence, is a representative probability for whether the image data block corresponds to a text portion of the image or a continuous tone portion of the image.

Preferably, Gaussian distributions are generated for both text data and continuous tone data such that probabilities for both text and continuous tone can be estimated independently for each image data block. The text probability is then normalized by dividing it by the sum of the two probabilities. The normalized text probability is then utilized to determine whether the data blocks correspond to text or continuous tone portions of the image. Among the additional characteristics which may be determined for each image data block are the following which are listed in order of preference: an image data block variance, an image data block edge count, an image data block agreement count, and an image data block text average.

It is, therefore, an object of the present invention to provide an improved method and apparatus for determining whether the image data correspond to text or continuous tone portions of an image represented by the data.

It is another object of the present invention to provide an improved method and apparatus for processing image data to determine whether the data correspond to text or continuous tone portions of the image wherein the image data is partitioned into contiguous image data blocks with the average grayscale value being determined for each of the data blocks and used as an indexing variable for the formation of a one dimensional Gaussian distribution for at least one additional characteristic of the data block with the mean and standard deviation being determined for each data distribution and the Mahalanobis distance for each additional characteristic data value being determined as a representative probability for whether the data block corresponds to a text portion of the image or a continuous tone portion of the image.

Other objects and advantages of the invention will be apparent from the following description, the accompanying drawings and the appended claims.

BRIEF DESCRIPTION OF THE DRAWINGS

FIG. 1 is a graphical representation of a normal or Gaussian distribution.

FIG. 2 is a graphical representation of the Mahalanobis distance associated with a Gaussian distribution.

FIG. 3A is a block diagram of an implementation of a low-pass image data filter.

FIG. 3B is a matrix equation for the low-pass filter of FIG. 3A.

FIG. 4A is a block diagram of an implementation for determining a block average characteristic.

FIG. 4B shows the elements of a four pel by four pel image data block.

FIG. 5 is a block diagram of an implementation for determining a block variance characteristic.

FIG. 8 is a block diagram of an implementation for accumulating the block text average, block agreement counts and block edge counts.

FIGS. 9 and 10 are block diagrams of two implementations for generating a normalized text probability.

DETAILED DESCRIPTION OF THE INVENTION

Figure 6:
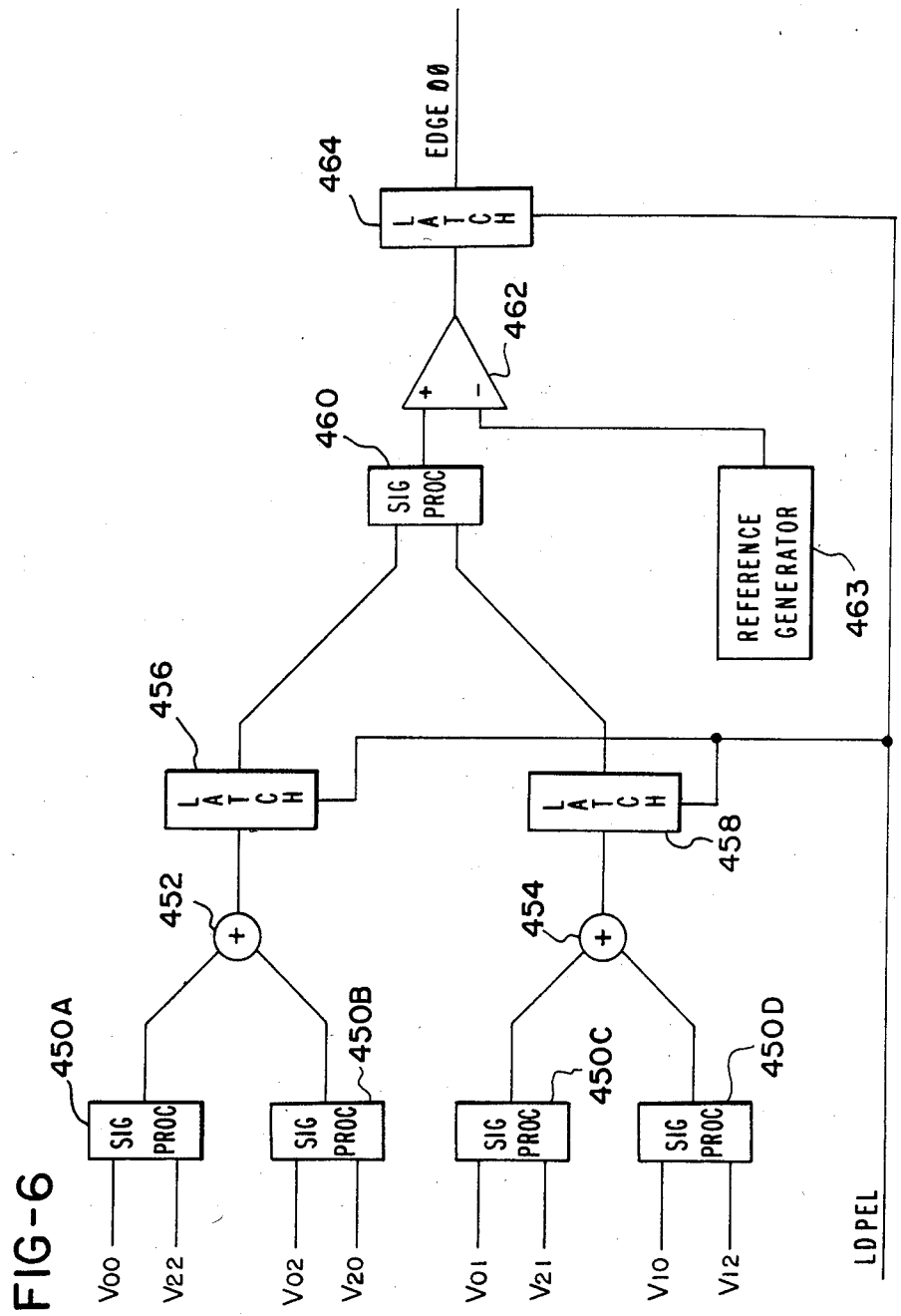
FIG. 6 is a block diagram of an implementation for determining block edge indications.

In accordance with the present invention, image data obtained by scanning a picture, document or other image are processed to determine selected characteristics of the image data. Based on the selected characteristics, a decision is made as to whether the image data correspond to text portions of the image or continuous tone portions of the image.

For processing, the image data are subdivided into contiguous image data blocks each of which preferably comprises four pels by four pels. Each of the individual pels of an image data block is represented by its corresponding grayscale value which is the raw data obtained from the scanner.

The grayscale values are processed as will be described hereinafter, to obtain the following characteristics of the individual image data blocks; a block average which is essentially the average grayscale value of the pels represented by an image data block; a block variance which is essentially the statistical variance of the grayscale values of the pels represented by an image data block; a block edge count which is a determination of the number of pels which are associated with an edge of a figure in the portion of the image represented by an image data block; a block text average which is the summation of the number of pels in an image data block having a grayscale value exceeding a text threshold; and, a block agreement count which is formed by initially comparing the grayscale values of the pels of an image data block to an alternate text threshold and counting the number of pels for which the determination was the same as in the text average determination. These image data block characteristics will be more fully described hereinafter.

Applicants have determined that the block average, i.e., the average grayscale value of an image data block, can be used as an independent or indexing variable for the remaining block characteristics: the block variance, the block edge count, the block text average and the block agreement count. With the block average used as an independent or indexing variable, the remaining characteristics are distributed approximately as a normal or Gaussian distribution as shown in FIG. 1 and defined by the equation:

$$f(x) = \frac{1}{\sqrt{2\pi}} e^{-\frac{(x-\eta)^2}{2\sigma^2}}$$

where $\eta$ is the mean of the distribution and $\sigma$ is the standard deviation.

The Mahalanobis distance (MHD) as defined by the equation:

$$MHD = \frac{(X - \eta)^2}{\sigma^2}$$

and shown in FIG. 2, may be utilized as a scaled measure of the distance of a given data value X from the mean $\eta$ of a distribution. The smaller the Mahalanobis distance, the more likely the given data value X corresponds to the data type represented by the distribution. Hence, the Mahalanobis distance of a characteristic data value for a given data block is a representative measure of whether the given data block is a text portion of a continuous tone portion of the corresponding image. Whether the Mahalanobis distance represents a text probability or a continuous tone probability is dependent upon the distribution being applied, i.e., a text distribution gives text probabilities and a continuous tone distribution gives continuous tone probabilities.

The value of the mean $\eta$ and the standard deviation $\sigma$ are determined for each of the data distributions for both text and continuous tone data for each block average value. Thus, given a block average and at least one additional characteristic for an image data block, both a text probability and a continuous tone probability can be determined.

A convenient way to implement the present invention is to form tables for each of the characteristics with the tables being entered by means of the block average and a second block characteristic data value. For example, the following tables can be formed for both text and continuous tone: average/variance; average/edge count; average/text average; and, average/agreement count.

In one embodiment of the present invention, the Mahalanobis distance tables for both text and continuous tone data are stored in programmable read-only memories (PROM's). When a programmable read-only memory (PROM) is addressed by a corresponding block average and characteristic data value, the probability that the combination of the two characteristics will result from text or continuous tone image data (depending upon the portion of the PROM addressed) is generated at the output of the PROM.

For convenience, the Mahalanobis distances are stored in logarithmic form. Hence, the logarithmic Mahalanobis distances or probabilities for each distributed characteristic which is utilized can then be added together and converted, for example, by means of an antilogarithmic look-up table, to form representative probabilities. The resulting probabilities are then analyzed to determine whether the image data block being evaluated corresponds to a text portion of the scanned image or a continuous tone portion of the scanned image. Since the probabilities for text and continuous tone are independently calculated, the sum of the two need not be equal to one. Hence, the more probable of the two may have a probability of less that 0.50. Likewise, the less probable of the two may have a probability of more than 0.50.

Preferably, a normalized text probability is formed by dividing the text probability by the sum of the text probability and the continuous tone probability. The normalized text probability thus determined for an image data block and the normalized text probabilities of each of the blocks contiguous to it are then applied to a first decision filter which updates the normalized text probability to increase it or decrease it based on the probabilities of the surrounding blocks. Thus, if all the surrounding blocks are text, text will be highly favored for the block, whereas if all the surrounding blocks are continuous tone, continuous tone will be highly favored for the block. Based on the first decision filter, blocks identified as text are given a value of "one" and blocks identified as continuous tone are given a value of "zero".

Figures 7, 12:
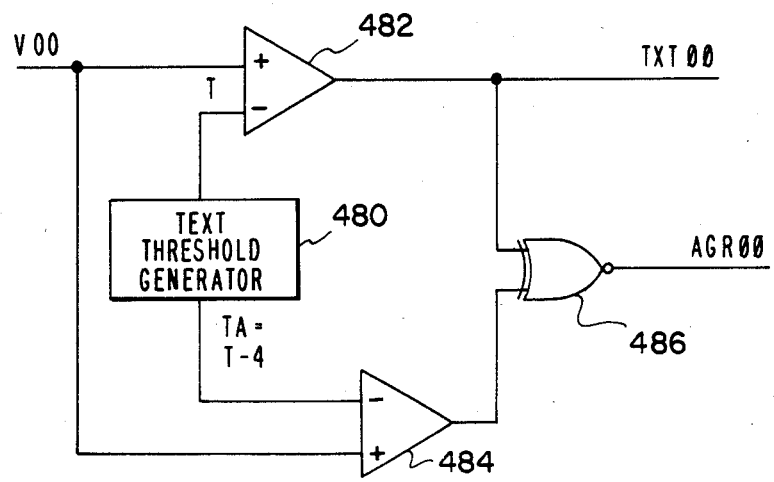
FIG. 7 shows an implementation for determining text average and agreement count characteristics.
FIG. 12 is a 100 element matrix showing the cross-shaped formation of blocks processed by a second decision filter (see drawing sheet 5).

Finally, a second decision filter is applied to 45 image data blocks arranged in three by three matrices of blocks with the block being evaluated being in the center of a centered three by three matrix with the immediately adjacent three by three matrices to either side and to the top and bottom of the matrix containing the block being evaluated, i.e., a cross-shaped formation of four pel by four pel blocks as shown in FIG. 12.

In the second decision filter, each of the individual block values from the first decision filter, i.e., "one" or "zero", are counted up for the entire 45 block area. If the count is greater than a defined threshold, the final result is text. If the count is not greater than the defined threshold, the final result is continuous tone. Hysteresis is used in the threshold in that if the decision from the first decision filter is text, the threshold is set lower than if the decision from the first decision filter is continuous tone. In a working embodiment of the present invention, the threshold for a previous text decision was set equal to 18, thus favoring a decision of text, and the threshold for a previous continuous tone decision was set equal to 26, thus favoring continuous tone.

Exemplary characteristics of image data blocks to be processed in accordance with the present invention will now be defined and illustrative embodiments for their generation will be described. It is noted that while the defined characteristics have been utilized in a working embodiment of the invention, various combinations of the defined characteristics and/or other characteristics of the image data blocks can be applied in accordance with the present invention. Accordingly, this disclosure should be interpreted to include such variations as will be suggested to those skilled in the art.

As previously noted, the image data blocks are preferably four pel by four pel blocks with each of the pels being represented by a grayscale value determined by an image scanner. In the illustrative embodiments, 16 differing grayscale values are utilized ranging from zero for a white pel to 15 for a black pel.

For the determination of the block average and block variance, preferably the input grayscale value image data is passed through a low-pass filter to reduce extraneous noise which may be present in the data. One low-pass filter which may be used is defined by a three by three matrix which is applied to each individual pel and all the pels contiguous thereto. The function of the low-pass filter may be defined mathematically as:

$$LP(X,Y) = \frac{1}{16} \sum_{i=-1}^{1} \sum_{j=-1}^{1} M(i,j) \cdot I(X+i, Y+j)$$

where I is the input grayscale value of the corresponding pel and the matrix M (i,j) is the matrix 121 242 121 as follows:

$$M(i,j) = \begin{array}{c} -1 \\ 0 \\ 1 \end{array} \begin{array}{|c|c|c|} \hline 1 & 2 & 1 \\ \hline 2 & 4 & 2 \\ \hline 1 & 2 & 1 \\ \hline \end{array}$$
$$\phantom{M(i,j) = \ } -1 \ \ 0 \ \ 1$$

A block diagram for an implementation of this low-pass filter is shown in FIG. 3A. An understanding of the operation of the low-pass filter of FIG. 3A is facilitated by reviewing a 3×3 input matrix comprising the elements $V_{00}$ through $V_{22}$ as shown in FIG. 3B. Each column of the matrix is applied to the low-pass filter as signified by the first column of the matrix $V_{00}$, $V_{10}$ and $V_{20}$. $V_{00}$ and $V_{20}$ are added together by an adder circuit 300, while $V_{10}$ is multiplied by two by a multiplier circuit 302. The outputs of the adder circuit 300 and the multiplier 302 are passed to a second adder circuit 304. Thus, the first and third elements of the first column are added to twice the second element with the result appearing as the output of the adder circuit 304.

The result is stored in a latch circuit 306 and the next column $V_{01}$, $V_{11}$ and $V_{21}$ are passed to the input of the low-pass filter. The same operation is performed on the second column and the results of the multipliction and addition of the first column are passed from the latch circuit 306 to a latch circuit 308 with the results of the processing of the second column being stored in the latch circuit 306.

The third column is then processed as were the first and second columns with the results remaining at the output of the adder circuit 304. The contents of the latch circuit 308, i.e., the first column multiplied by 121, is added to the third column which also has been multiplied by 121 by means of an adder circuit 310. The contents of the latch 306 which is the center column multiplied by 121 is then multiplied by two by a multiplier circuit 312 which then provides at its output the center column multiplied by the factors 242 with all three of the columns appropriately multiplied being added by an adder circuit 314.

The result is then divided by 16 by a divider circuit 316 and stored in a latch circuit 318. The latch circuit 318 then holds the low-pass filtered value for the center pel $V_{11}$ of the three by three matrix of pels shown in FIG. 3B. The latch circuits 306, 308 and 318 are all activated by a load low-pass LDLP signal which stores the low-pass value for the current pel into the latch circuit 318 and also loads the latch circuits 306 and 308 in preparation for determining the low-pass value of the pel $V_{12}$.

The block average of an image data block is determined by summing the low-pass filtered grayscale values of all of the pels of the block and dividing that sum by 16. The block average is defined by the equation:

$$AVG(X_B, Y_B) = \frac{1}{16} \sum_{i=X_B}^{X_B+3} \sum_{j=Y}^{Y_B+3} LP(i,j)$$

A block diagram of an implementation for determining the average grayscale value, i.e., the block average, for an image data block is shown in FIG. 4A. Video image data from the low-pass filter previously described is passed to the input 348 of the block average circuit of FIG. 4A on a scan line by scan line basis. As the first row of an image data block comprising the elements $V_{00}$, $V_{01}$, $V_{02}$ and $V_{03}$ as shown in FIG. 4B are passed to the block average circuit, they are progressively loaded into latch circuits 350, 352 and 354 by a load low-pass video LPLPV signal such that when low-pass filtered video element $V_{00}$ is available at the input 348 of the block average circuit, the elements $V_{01}$, $V_{02}$ and $V_{03}$ are stored in the latch circuits 350, 352 and 354, respectively.

$V_{00}$ and $V_{01}$ are added by an adder circuit 356, and $V_{02}$ and $V_{03}$ are added by an adder circuit 358. The output signals from the adder circuits 356 and 358 are passed to an adder circuit 360 such that the four low-pass filtered video signals of a row of an image data block are added together. The output signals of the adder circuit 360 are passed to an adder circuit 362 which also receives the output signals of a random access memory (RAM) 364 when select enable /SELEN signals are applied to the RAM 364. The RAM 364 is sized to accumulate the sums of the rows of the image data blocks across a field of image data. For example, a 2K RAM provides for up to 8,000 pels across the scanning width of an image to be processed if each block is four pels wide.

The RAM 364 is addressed to select a memory location corresponding to the data block being processed. For the first row of a data block, a latch circuit 368 is cleared by applying a clear accumulation signal /CLRAC. A driver circuit 368 is activated by applying a gate enable signal /GATEN and the output signals from the RAM 364 are disabled by removing the select enable signal /SELEN such that the input signals to the adder circuit 362 from the RAM 364 are zero. The output signals from the adder circuit 362 are thus equal to the sum of the first row pels $V_{00}$, $V_{01}$, $V_{02}$ and $V_{03}$ which is latched into the latch circuit 366 by load block LDBLK signals. The contents of the latch circuit 366 are then written into the RAM 364 at the addressed location corresponding to the image data block being processed, overwriting any previous contents of that location.

The next time that the incoming low-pass filtered video scan data corresponds to this image data block, the sum of the first row elements are read from the RAM 364 and added to the sum of the second row pels $V_{10}$, $V_{11}$, $V_{12}$ and $V_{13}$ with the cumulative result again being stored in the latch circuit 366 and then in the RAM 364. This process continues until the latch circuit 366 contains the sum of all the low-pass video filtered pels of an image data block. The output signal of the latch circuit 366 is then divided by 16 by a divider circuit 370 such that the image data block average is available at the output of the divider circuit 370.

The variance for an image data block is defined by the equation:

$$VARIANCE(X_B, Y_B) = \frac{1}{16} \sum_{i=X_B}^{X_B+3} \sum_{j=Y_B}^{Y_B+3} [LP(i,j)]^2 - [AVG(X_B, Y_B)]^2$$

A block diagram of an implementation for generating the block variance is shown in FIG. 5. Each row of an image data block (see FIG. 4B) after it has been low-pass filtered, as previously described, is passed to the input 398 of the variance circuit of FIG. 5.

Signal processing circuits 400 square the two input signals, add the two squares together and divide the sum of the squares by two. Hence, the low-pass video input signals for a row are squared, divided by two and appear at the output of an adder circuit 402. The output signals of the adder circuit 402 are passed to an adder circuit 404 which also receives output signals from a random access memory (RAM) 406 when select enable /SELEN signals are applied to the RAM 406.

While the signal processing circuits 400 can be implemented by means of a variety of circuitry, they are preferably implemented as programmable read-only memories (PROM's) which are addressed by the low-pass filtered row data. Each possible combination of the low-pass filtered row data can thus be used to address unique locations within the PROM's. The data stored at those locations then are the values obtained by the operations just described.

The output signals of the adder circuit 404 are latched into a latch circuit 408 by load block LDBLK signals. The output of the latch circuit 408 is connected to the data leads of the RAM 406 by means of a driver circuit 410 which is activated by gate enable /GATEN signals. In a manner similar to that described with reference to the block average circuit of FIG. 4A, the processed rows of video low-pass filtered data are accumulated in the RAM 406 which is read or written depending upon the state of write enable /WRTEN signals. Eventually, a signal representative of the entire image data block is available at the output of the adder circuit 404. The output signal from the adder circuit 404 is then stored in the latch circuit 408, divided by eight by a divider circuit 412 and passed to an adder circuit 414.

The output of the block average circuit of FIG. 4A is passed to an input 416 of a squaring and sign changing circuit 418, the output of which is connected to the adder circuit 414. The output signals of the adder circuit 414 are stored in a latch circuit 420 which then contains the variance for the associated image data block as defined in the above equation. The latch circuits 408 and 420 can be cleared by applying clear accumulation /CLRAC signals thereto. The squaring and sign change circuit preferably comprises a programmable read-only memory although other circuit implementations are possible.

Whether or not a pel is at an edge of a character of the original image, i.e, a point where a sharp change in grayscale value is encountered, is determined by examining the pels contiguous to the pel to be evaluated. The magnitude of the differences between the grayscale values of the diagonally opposite pairs of pels contiguous to the pel being evaluated are added to one another and the magnitude of the difference between the grayscale values of the horizontally and vertically opposite pairs of pels contiguous to the pel being evaluated are also added together with the two sums being multiplied by one another and divided by 16.

This calculation determines an edge value and is shown mathematically by the following equation:

$$EDGE(X,Y) = (|I(X-1,Y-1) - I(X+1,Y+1)| + |I(X+1,Y-1) - I(X-1,Y+1)|) \times (|I(X,Y-1) - I(X,Y+1)| + |I(X-1,Y) - I(X+1,Y)|) \times \frac{1}{16}$$

The edge value is then compared to a reference value, nominally six. If the edge value exceeds six, the pel is considered to be on an edge of a character of the image and a value of "one" is assigned; otherwise, the pel is considered not to be on an edge of a character and a value of "zero" is assigned. This assignment is represented by the following equations:

IF EDGE (X,Y)>6, E(X,Y)=1 else E(X,Y)=0

The edge indications for all of the pels of an image data block are summed to arrive at an edge count characteristic of an image data block. The edge count can be represented by the following equation:

$$EDGE(X_B, Y_B) = \sum_{i=X_B}^{X_B+3} \sum_{j=Y_B}^{Y_B+3} E(i,j)$$

A block diagram of an implementation for generating the edge values and assigning the ones and zeros to the individual pels of an image data block is shown in FIG. 6. Signal processing circuits 450A through 450D determine the absolute value of the difference between the signals on inputs A and B of the devices, i.e., $|A-B|$. A pel to be evaluated is positioned as the center pel $V_{11}$ of a three by three pel matrix such as that shown in FIG. 3B. The grayscale values of the diagonally opposite pairs of pels contiguous to the pel to be evaluated ($V_{00}$, $V_{22}$; $V_{02}$, $V_{20}$) are passed to the circuits 450A and 450B and the grayscale values of the horizontal and vertical pairs of pels contiguous to the pel to be evaluated ($V_{01}$, $V_{21}$; $V_{10}$, $V_{12}$) are passed to the circuits 450C and 450D.

The outer signals of the signal processing circuits 450A and 450B are summed by an adder circuit 452 while the output signals from the signal processing circuits 450C and 450D are summed by an adder circuit 454. The output signals from the adder circuit 452 are stored in a latch circuit 456 and the output signals from the adder circuit 454 are stored in a latch circuit 458 by applying a load pel LDPEL signal to the latches. The output signals from the latch circuits 456 and 458 are passed to a signal processing circuit 460 which multiplies the two values by one another and then divides the resultant value by 16. The output signal of the processing circuit 460 is passed to the positive input of a comparator circuit 462. The negative input of the comparator circuit 462 receives an edge value threshold, nominally six, from a reference generator 463. If the output signal of the processing circuit 460 exceeds the edge value threshold, an edge indication is generated and stored in a latch circuit 464.

While the signal processing circuits 450A-450D and 460 can be implemented by means of a variety of circuitry, they are preferably implemented as programmable read-only memories (PROM's) which are addressed by the corresponding input signals. Each possible combination of the corresponding input signals can thus be used to address unique locations within the PROM's. The data stored at those locations then are the appropriate values obtained by the operations just described.

A text average characteristic is determined for each image data block by summing the number of pels which have a grayscale value exceeding a text threshold T. As shown in FIG. 7, the grayscale value of each pel of an image data block is compared by means of a comparator circuit 482 to the text threshold T generated by a text threshold generator 480. An output of "one" indicates that the text threshold T was exceeded while an output of "zero" indicates that the text threshold T was not exceeded.

The text threshold T to which the grayscale values of the pels of an image data block are compared is typically the text threshold value utilized for ultimately processing the image data in the event the image data is determined to represent text portions of an image. Accordingly, both fixed and variable thresholds as are known in the art can be utilized in the image decision processor of the present invention. A preferred text threshold is disclosed in U.S. patent application Ser. No. 642,016 entitled "Adaptive Threshold Document Duplication" filed by Bobick and Kannapell, assigned to the same assignee as the present application and incorporated herein by reference. The text average is defined by the following equations:

IF $I(X,Y) > T$    $T(X,Y) = 1$
else                 $T(X,Y) = 0$ $$TEXT(X_B, Y_B) = \sum_{i=X_B}^{X_B+3} \sum_{j=Y_B}^{Y_B+3} T(i,j)$$

It is also noted that it may be desireable to adjust the threshold if edge pels are involved to enhance character edges of the image. In a working embodiment of the present invention, the threshold T was set to T+2 for edge areas of the image data. However, since such threshold shifts form no part of the present invention, they will not be further described herein.

Also, an agreement count characteristic is generated for the image data blocks. As shown in FIG. 7, the grayscale value of each pel of an image data block is also compared by means of a comparator circuit 484 to an alternate threshold $T_A$ generated by the text threshold generator 480, i.e., the threshold T is altered by reducing the original text threshold by four, $T_A = T - 4$. If the grayscale value of the pel is greater than the alternate text threshold T, a value of "one" is assigned to the pel; otherwise, a value of "zero" is assigned. This is indicated by the following equations:

IF I(X,Y)>$T_A$ T'(X,Y)=1 else T'(X,Y)=0

The text average values are then compared to the alternate text threshold values by a comparator circuit 486 with an agreement value of "one" being assigned to the pel if they are equal and an agreement value of "zero" if they are not equal. The agreement count is then determined by summing the assigned agreement values for the pels of an image data block. These operations are indicated by the following equations:

$$\text{IF} \quad T(X,Y) = T'(X,Y), \quad A(X,Y) = 1$$
$$\text{else} \quad A(X,Y) = 0$$

$$\text{AGREE}(X_B, Y_B) = \sum_{i=X_B}^{X_B+3} \sum_{j=Y_B}^{Y_B+3} A(i,j)$$

A block diagram of an implementation for accumulating the block text average, the block agreement count and the block edge count is shown in FIG. 8. The pel text average indications from the comparator 482 of FIG. 7, the pel agreement indications from the comparator 486 of FIG. 7, and the pel edge indications from the latch circuit 464 of FIG. 6 are passed to the inputs 498 of the circuit of FIG. 8 and loaded into latch circuits 500, 502 and 504, respectively. The block text average, block agreement count and block edge count are accumulated in a manner similar to that previously described with reference to the variance calculator of FIG. 5 and the block average circuit of FIG. 4A. Since each of the accumulations are the same, only the accumulation for the block text average will be described.

The individual text indications generated by thresholding the grayscale values of the individual pels of an image data block are passed to the input 498A to the latch circuit 500A and are also connected as an input to a signal processing circuit 506. After three text indications have been applied to the input 498A of the latch circuit 500A, those three text values corresponding to a given row of an image data block are stored in the latches 500A through 500C by appropriate application of load pel LDPEL signals to the latches. A fourth text signal is then applied to and is available on the input 498A.

A Random Access Memory (RAM) 508 has its data leads connected as an input to the signal processing circuit 506. The four text indications are added by the signal processing circuit 506 to the output signals from the RAM 508 which are enabled by application of select enable /SELEN signals. The sum is stored into a latch circuit 510. The output signals of the latch circuit 510 are gated to the RAM 508 by applying gate enable /GATEN signals to a driver circuit 512 such that the sums for the rows of an image data block can be accumulated in the RAM 508 and added to the other rows of the block by the signal processing circuit 506. Each sum so determined is passed to the latch circuit 510 and ultimately to a latch circuit 514.

Here again, the output signals from the RAM 508 are zeroed or disabled by removal of the select enable /SELEN signals during processing of the first row of a data block such that the sum of the first row text values can be determined and written into the RAM 508 at the addressed location corresponding to the image data block being processed, overwriting any previous contents of that location. Since the accumulations of the block agreement count and the block edge count are the same as that for the block text average, these accumulations will not be described herein. The signal processing circuit 506 can be implemented as an adder circuit or in a variety of other circuit configurations. However, it is preferably implemented as a programmable read-only memory which is addressed by the input signals applied thereto. Each possible combination of the input signals address a unique location which contains the appropriate sum of those signals.

Figure 10:
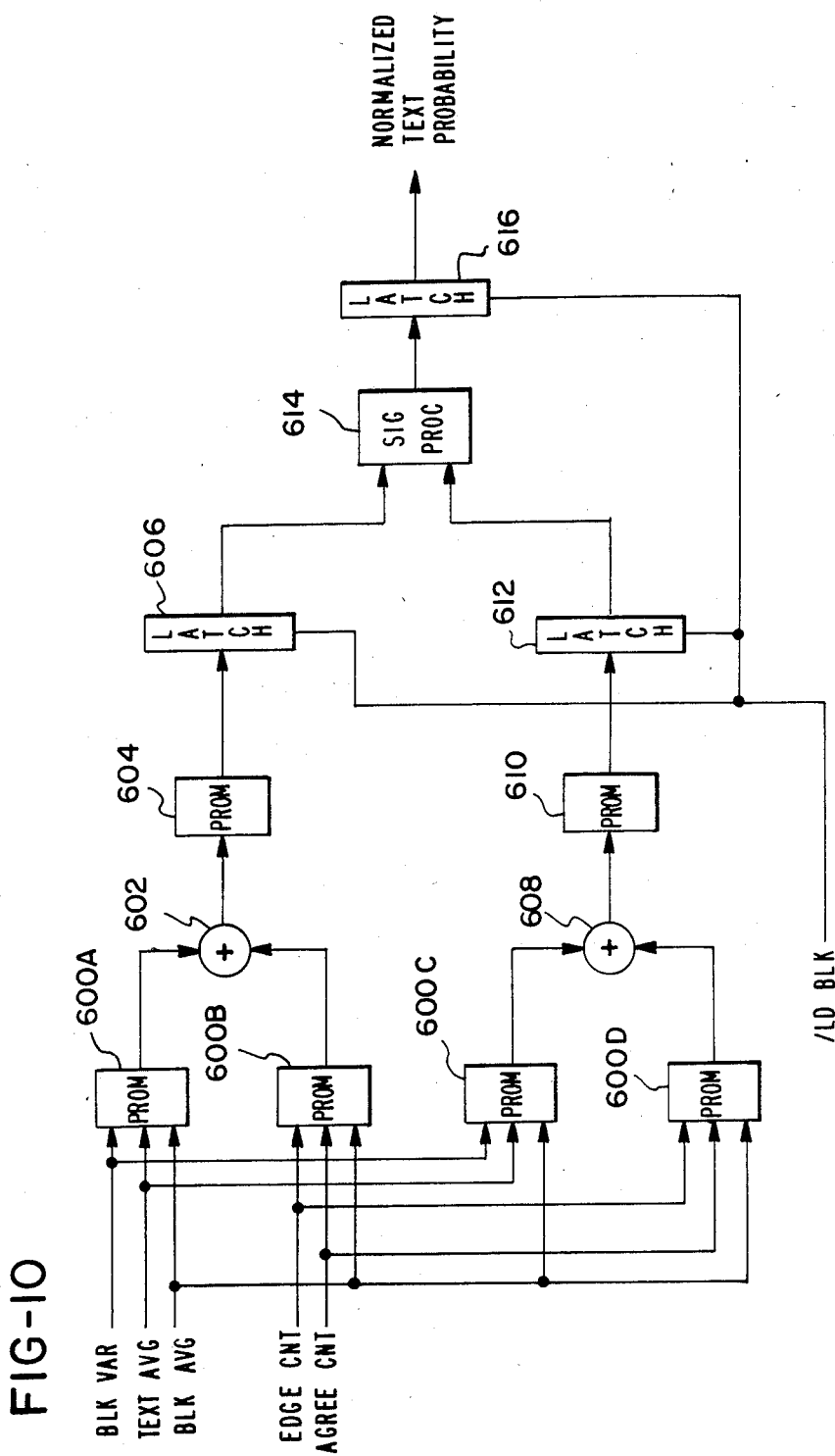

FIGS. 9 and 10 show block diagrams of two embodiments for generating a normalized text probability in response to the image data block characteristics which have just been described. The embodiment of FIG. 9 includes five programmable read-only memories (PROM's) 550 into which Mahalanobis distance tables may be stored. The upper four PROM's 550A-550D each receive the block average of image data blocks of the current scan row (which comprises four scan lines) as the indexing variable. The distributed variable for each of the PROM's is the block text average for the PROM 550A; the agreement count for the PROM 550B; and the edge count for the PROM 550C. The PROM 550D is a spare and can be utilized to receive an additional image data block characteristic in the event such a characteristic is to be included in the generation of the normalized text probability.

The PROM 550E receives a delayed block average signal as the indexing variable and the block variance of the image data blocks of the preceding scan row as the distributed variable. The reason that the PROM 550E is handled differently than the PROM's 550A-550D is that in the embodiment of FIG. 9 the image data blocks are further filtered before the block variance is determined. That is, a low-pass filter (for example, the low-pass filter shown in FIG. 3A) is applied to the block averages before they are applied to the variance generating circuit of FIG. 5.

This filtering at the block level serves to disperse the image characteristics across an entire character stroke and thereby "smear" the low frequency content of the stroke, and thus the variance across the character stroke. If block level filtering is not performed, the variance is zero just before a character edge is encountered, very high on the character edge, zero as you pass across the character, and once again, very high on the descending edge of the character before returning to zero just beyond the descending character edge. Due to the block level filtering, the block variance is not available until after the required blocks of the following scan row have been received and partially processed since the blocks contiguous to a block for which the variance is to be calculated must be available to apply the filter on a block level basis.

Accordingly, in the embodiment of FIG. 9, the Mahalanobis distances read from the memories 550A-550C are added together by means of adder circuits 552, 554 and 556 and stored into a latch circuit 558 (the contents of the memory 550D are set equal to zero since it is a spare for any additional characteristic to be included in the analysis). The output signals from the latch circuit 558 are passed to a latch circuit 560 and the data terminals of a random access memory (RAM) 562 by applying a write Mahalanobis distance /WRTMHD signal to a driver circuit 564. The latch circuits 558 and 560 are latched by applying a load Mahalanobis distance LDMHD signal thereto.

The RAM 562 provides a delay of approximately one scan trip such that the probabilities read from the PROM's 550A-550C can be summed as the data becomes available and stored into the RAM 562 by the /WRTMHD signal. When the block variance is available (approximately one scan strip later), the RAM 562 provides the sum of the probabilities or Mahalanobis distances from the PROM's 550A-550C which was previously read, summed and stored such that they can be added to the Mahalanobis distances or effective probabilities determined by the delayed block average and block variance which are read from the PROM 550E. An adder circuit 566 combines the output signals from the latch circuit 560 with the output signals from the PROM 550E to arrive at a total sum of the Mahalanobis distances or effective probabilities based on the given image data block characteristics which were used to address the PROM's 550A-550E.

The PROM's 550A-550E contain the Mahalanobis distances or probabilities for both text and continuous tone based on the corresponding pairs of characteristic input signals used to address the PROM's. Both a text probability and a continuous tone probability are calculated by addressing appropriate portions of the PROM's 550A-550E and the RAM 562. Since the Mahalanobis distances are stored in the form of natural logarithms, the antilogarithm of the sum is taken by a PROM 568 which functions as a table lookup to generate the antilogarithm of the input signals.

The continuous tone probability is initially determined and passed from the PROM 568 to a latch circuit 570 where it is stored by applying a probability load PBLD signal. The text probability is then determined and passed from the PROM 568 to the latch circuit 570 and the continuous tone probability contained within the latch 570 is loaded into a latch circuit 572 again by applying the PBLD signal. A normalized text probability is generated by a signal processing circuit 574 by taking the text probability contained within the latch circuit 570 and dividing it by the sum of the text probability from the latch circuit 570 and the continuous tone probability from the latch circuit 572. The normalized text probability is passed from the signal processing circuit 574 into a latch circuit 576 by applying a load block LDBLK signal. While the signal processing circuit 574 can be implemented by means of a variety of circuitry, it is preferably implemented as a programmable read-only memory (PROM) which is addressed by the signals on the A and B inputs. Each possible combination of the input signals can thus be used to address a unique location within the PROM. The data stored at those locations then are the values obtained by the calculations just described.

A second embodiment of probability generating circuitry is shown in FIG. 10. In the second embodiment of FIG. 10, block level low-pass filtering of the image data blocks for calculation of the variance as discussed relative to the embodiment of FIG. 9 has been eliminated in the interest of simplifying the circuitry required. In the embodiment of FIG. 10, two of the characteristics are combined for distribution such that the two characteristics together with the indexing variable or average grayscale value are utilized to address the programmable read-only memories (PROM's) 600. This combination permits a reduction in the circuitry required and also permits a sophistication in the generation of the continuous tone and text probabilities in accordance with the present invention.

In the embodiment of FIG. 9, the addition of the individual Mahalanobis distances or the effective probabilities is an approximation. The generation of Mahalanobis distances representative of two combined characteristics of the image data blocks theoretically reduces this approximation by permitting interrelations between the characteristics to be reflected in nonlinearities of the values stored in the PROM's 600. Such nonlinearities cannot be accounted for or easily accommodated in the embodiment of FIG. 9. In the embodiment of FIG. 10, the Mahalanobis distances corresponding to text probabilities are stored in the PROM's 600A and 600B and the Mahalanobis distances corresponding to continuous tone probabilities are stored in the PROM's 600C and 600D.

The Mahalanobis distances or effective probabilities for text based on the combination of the block variance and block text average characteristics are read from the PROM 600A and added by an adder circuit 602 to the Mahalanobis distances or effective probabilities based on the combination of the block edge count and block agreement count characteristics which are read from the PROM 600B. Here again, the Mahalanobis distances or effective probabilities are stored in the form of natural logarithms and the antilogarithm of the sum in taken by means of a PROM 604 which functions as a lookup table. The text probabilities from the PROM 604 are stored into a latch circuit 606 by applying a load block LDBLK signal thereto.

In a similar manner, the combined Mahalanobis distances or effective probabilities for continuous tone are read from the PROM's 600C and 600D and added together by an adder circuit 608. The antilogarithm of the signals from the adder circuit 608 is generated by a PROM 610 which functions as a lookup table and the result is stored into a latch circuit 612. The output signals from the latch circuits 606 and 612 are passed to a signal processing circuit 614. The signal processing circuit 614 takes the text probability and divides it by the sum of the text probability and the continuous tone probability to arrive at a normalized text probability which is stored into a latch circuit 616. Here again, the signal processing circuit 614 is preferably implemented as a programmable read-only memory although a variety of alternate circuit implementations are possible.

The differences between the embodiments of FIG. 9 and FIG. 10 show that various characteristics of the image data blocks may be combined to account for interrelationships between and among the characteristics. Such interrelationships can be accounted for by nonlinearities which are incorporated into the Mahalanobis distances or effective probabilities stored within the PROM's 600. It should be apparent that different characteristics than those combined in FIG. 10 can also be combined. The ultimate implementation of the present invention is a multiple input PROM which is addressed by all characteristics which are generated for each of the image data blocks to be evaluated. While such an implementation which permits full interaction between and among the various block characteristics is perceived as being the ultimate in terms of the present invention, to-date only the embodiments of FIG. 9 and FIG. 10 have been implemented. This ultimate implementation is currently limited by the size of commercially available PROMs and signal processing circuits.

For the embodiments of FIGS. 9 and 10, PROM programs have been generated as shown in Appendices I and II, respectively. Even though the embodiment of FIG. 10 is perceived to be the more advanced from a hardware perspective, the PROM programs for the embodiment of FIG. 9 are the most recently implemented.

This discrepancy is due to the result of the most recent image data analysis. This analysis indicated that the block variance and block edge count characteristics are the most reliable of the image data block characteristics and provide the most consistent results. Accordingly, it was most convenient to insert data corresponding to the latest analysis into the embodiment of FIG. 9 by zeroing the block text average PROM 550A and the block agreement count PROM 550B and updating the block edge count PROM 550D and the block variance PROM 550E. Complete data analysis to determine the interactive relationships between and among the various block characteristics has not been performed to-date.

The normalized text probability generated by the embodiments shown in FIGS. 9, 10 or any other alternate embodiment is passed to a first decision filter which provides a probability update and makes an initial decision as to whether the image data blocks correspond to text or continuous tone. The first decision filter operates on a three-by-three matrix. Each element of the matrix comprises the normalized text probability for a four pel by four pel block of image data as determined from the Mahalanobis distance tables stored in the PROM's 500,600. The probability matrix is represented by the following:

| $P_{00}$ | $P_{01}$ | $P_{02}$ |
|---|---|---|
| $P_{10}$ | $P_{11}$ | $P_{12}$ |
| $P_{20}$ | $P_{21}$ | $P_{22}$ |

The probability update performed by the first decision filter is defined by the equation:

$$P_{11}^{UPDATE}(\text{TEXT}) = \frac{P_{11}(\text{TEXT}) \cdot M(\text{TEXT})}{P_{11}(\text{TEXT}) \cdot M(\text{TEXT}) + P_{11}(\text{TONE}) \cdot M(\text{TONE})}$$

$$P_{11}^{UPDATE}(\text{TONE}) = \frac{P_{11}(\text{TONE}) \cdot M(\text{TONE})}{P_{11}(\text{TONE}) \cdot M(\text{TONE}) + P_{11}(\text{TEXT}) \cdot M(\text{TEXT})}$$

where $P_{ij}(\text{TONE}) = 1 - P_{ij}(\text{TEXT})$;
$M(\ )$ is a probability modification factor;

$$M(\text{TEXT}) = \sum_{i=1}^{3} \sum_{j=1}^{3} W_{ij}(\text{TEXT/TEXT}) \cdot P_{ij}(\text{TEXT}) +$$

$$W_{ij}(\text{TEXT/TONE}) \cdot P_{ij}(\text{TONE}); \text{ and}$$

$$M(\text{TONE}) = \sum_{i=1}^{3} \sum_{j=1}^{3} W_{ij}(\text{TONE/TEXT}) \cdot P_{ij}(\text{TEXT}) +$$

$$W_{ij}(\text{TONE/TONE}) \cdot P_{ij}(\text{TONE})$$

where $W_{ij}(\text{TEXT/TEXT}) = 1/12$

| 1 | 2 | 1 |
|---|---|---|
| 2 | 0 | 2 |
| 1 | 2 | 1 |

$W_{ij}(\text{TEXT/TONE}) =$

| 0 | 0 | 0 |
|---|---|---|
| 0 | 0 | 0 |
| 0 | 0 | 0 |

$W_{ij}(\text{TONE/TEXT}) =$

| 0 | 0 | 0 |
|---|---|---|
| 0 | 0 | 0 |
| 0 | 0 | 0 |

; and $W_{ij}(\text{TONE/TONE}) = 1/12$

| 1 | 2 | 1 |
|---|---|---|
| 2 | 0 | 2 |
| 1 | 2 | 1 |

IF $P_{11}^{K+1}(\text{TEXT}) \geq P_{11}^{K+1}$ (TONE)  TEXT DECISION = 1
ELSE  TEXT DECISION = 0

Figure 11:
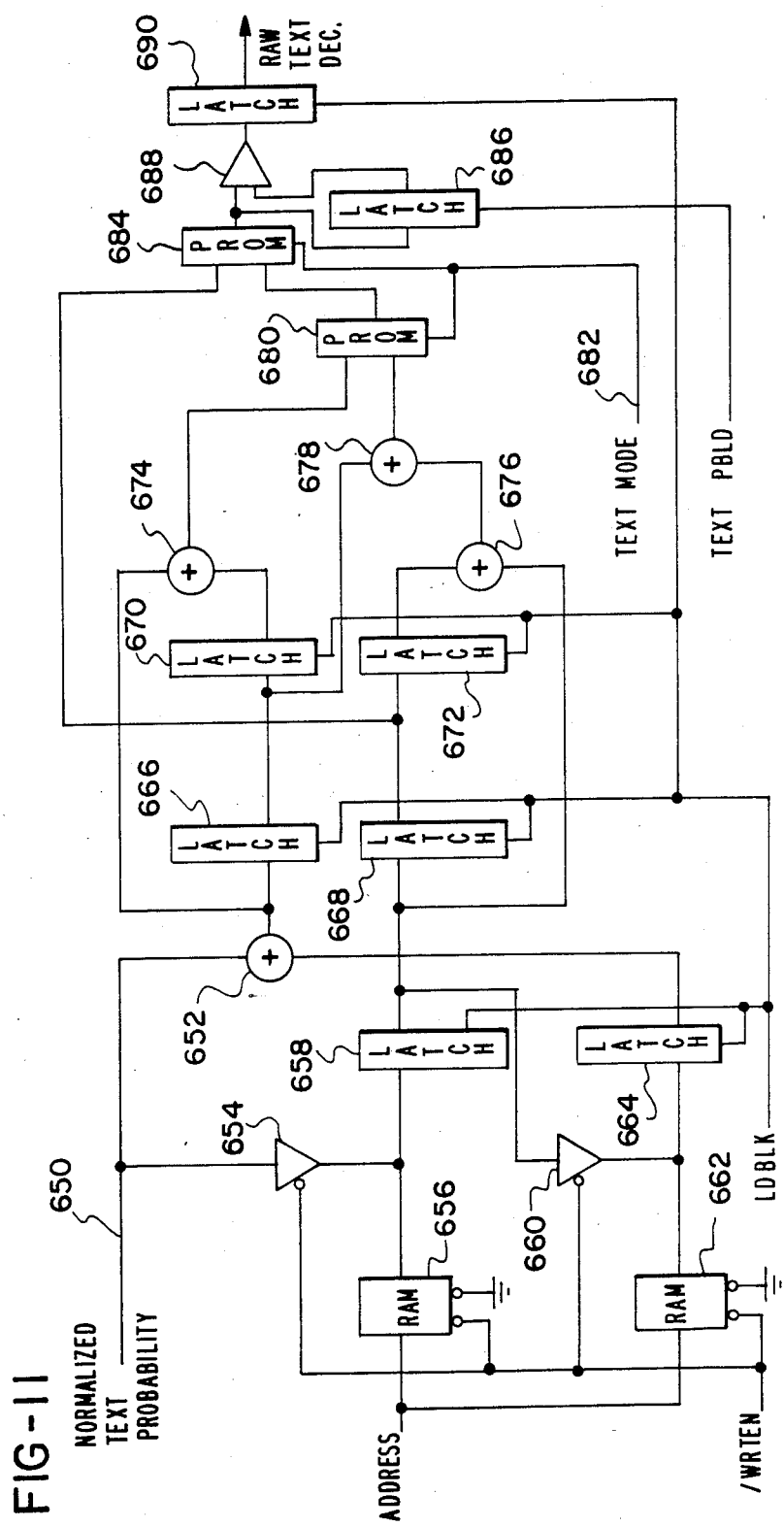
FIG. 11 is a block diagram of an implementation of a first decision filter.

A block diagram of an implementation of the first decision filter is shown in FIG. 11. The normalized text probabilities are input to the circuit of FIG. 11 on the conductors 650 which are connected to an adder circuit 652 and a driver circuit 654. The output of the driver circuit 654 is connected to the data terminals of a random access memory (RAM) 656 and the input of a latch circuit 658. The output of the latch circuit 658 is connected to a driver circuit 660 the output of which is connected to the data terminals of a random access memory (RAM) 662 and the input of a latch circuit 664. The operation and sequencing of the random access memories 656 and 662 serve to buffer the probabilities for scan rows or strips as the data is inputed on the conductors 650. The RAM's 656 and 662 are written and the driver circuits 660 and 654 are activated by applying write enable/WRTEN signals.

The operation of this circuitry should become clear upon an understanding of the operation of the first decision filter as shown in FIG. 11 which will now be described. It will be presumed that the circuit has been in operation for some time and that the first two probability scan lines of the three-by-three probability matrix comprising the elements $P_{00}$–$P_{12}$ as shown above have been inputed to the circuit such that the next input on the conductors 650 is the probability $P_{20}$.

When the signal $P_{20}$ is present on the input conductors 650, the RAM's 656 and 662 are addressed and read to obtain the normalized text probabilities for the corresponding blocks of the two preceding scan block rows or strips. Accordingly, the probability signals $P_{10}$ are read from the RAM 656 and stored into the latch circuit 658 and the probability signals $P_{00}$ are read from the RAM 662 and stored into the latch circuit 664. The adder circuit 652 adds the probabilities $P_{00}$ and $P_{20}$ and this sum is stored into a latch circuit 666. The probability $P_{10}$ is also passed from the latch circuit 658 to a latch circuit 668.

After these operations have been completed, the probability $P_{20}$ on the input conductors 650 is written into the RAM 656 at the same memory location and the probability $P_{10}$ from the output of the latch circuit 658 is written into the RAM 662 at the same memory location to update the RAM's 656 and 662. Next, the probability $P_{21}$ is passed to the conductors 650 and to the adder circuit 652. The address signals for the RAMs 656 and 662 are incremented to address the next corresponding locations such that the probability $P_{11}$ is available at the output of the RAM 656 and the probability $P_{01}$ is available at the output of the RAM 662.

The probability $P_{11}$ is latched into the latch circuit 658 and the probablity $P_{01}$ is latched into the latch circuit 664. The sum of the probabilities $P_{00}$ and $P_{20}$ contained within the latch circuit 666 is passed to a latch circuit 670 and the probability $P_{10}$ contained within the latch circuit 668 is passed to a latch circuit 672. The probability $P_{11}$ contained within the latch circuit 658 is stored into the latch circuit 668 and the sum of the probabilities $P_{01}$ and $P_{21}$ from the adder circuit 652 is stored into the latch circuit 666.

After these operations have been completed, the probability $P_{21}$ on the input conductors 650 is stored into the RAM 656 at the same memory location and the probability $P_{11}$ from the latch circuit 658 is stored into the RAM 662 at the same memory location to update the RAM's 656 and 662. Next, the probability $P_{22}$ is applied to the conductors 650 and to the input of the adder circuit 652. The address signals for the RAMs 656 and 662 are incremented to address the next corresponding locations such that the probability $P_{12}$ is available at the output of the RAM 656 and loaded into the latch circuit 658 while the probability $P_{02}$ is available at the output of the RAM circuit 662 and loaded into the latch circuit 664.

The output signals from the adder circuit 652 then are the sum of the probabilities $P_{02}$ from the latch circuit 664 and $P_{22}$, the present input signal on the conductors 650. The signals from the adder circuit 652 are added by an adder circuit 674 to the contents of the latch circuit 670 which contains the sum of the probabilities $P_{00}$ and $P_{20}$. Thus, the adder circuit 674 effectively adds the four corner probabilities $P_{00}$, $P_{02}$, $P_{20}$ and $P_{22}$ of the three-by-three matrix of probabilities being processed.

The probability $P_{12}$ from the latch circuit 658 is added to the probability $P_{10}$ from the latch circuit 672 by an adder circuit 676. This sum is added to the sum of the probabilities $P_{01}$ and $P_{21}$ contained within the latch circuit 666 by an adder circuit 678. This results in the sum of the horizontally and vertically opposite probabilities $P_{10}$, $P_{12}$, $P_{01}$ and $P_{21}$ of the probability matrix which is then available at the output of the adder circuit 678.

The two sums from the adder circuits 674 and 678 are passed to a programmable read-only memory (PROM) 680 which performs the text and continuous tone filtering operations in accordance with the above-defined equations. Either text or continuous tone filtering is performed by means of a control signal TEXT MODE received on conductors 682. The filtered data is passed to a programmable read-only memory (PROM) 684 together with the probability $P_{11}$ which is available in the latch circuit 668 to generate updated text and continuous tone probabilities also in accordance with the above-defined equations.

The updated text probability is stored in a latch circuit 686 and compared by a comparator circuit 688 to the updated continuous tone probability generated by the PROM 684. The output of the comparator circuit 688 is stored in a latch circuit 690. If the ultimate decision is text, a one is generated and stored into the latch circuit 690, and if the ultimate decision is continuous tone, a zero is generated and stored into the latch circuit 690. The latch circuit 686 is controlled by a text probability load TEXT PBLD signal while the remaining latch circuits of FIG. 11 are controlled by a load block LDBLK signal.

The "one" and "zero" raw text decision signals from the first decision filter of FIG. 11 are passed to a second decision filter which is applied to 45 image data blocks at a time. The 45 image data blocks are arranged into three-by-three matrices of blocks with the block being evaluated being in the center of a centered three-by-three matrix with the immediately adjacent three-by-three matrices to either side and to the top and bottom of the matrix containing the block being evaluated. The 45 image data blocks are, thus, assembled in a cross-shaped formation of four-by-four pel blocks as shown in FIG. 12.

In the second decision filter, each of the individual block values from the first decision filter, i.e., "one" or "zero", are counted up for the entire 45 block area. If the count is greater than a defined threshold, the final result is text. On the other hand, if the count is not greater than the defined threshold, the final result is continuous tone. Hysteresis is used in the threshold in that if the decision from the first decision filter is text, the threshold is set lower than if the decision from the first decision filter is continuous tone. In a working embodiment of the present invention, the threshold for a previous text decision was set equal to 18, thus favoring a decision of text, and the threshold for a previous continuous tone decision was set equal to 26, thus favoring continuous tone.

Figure 13A:
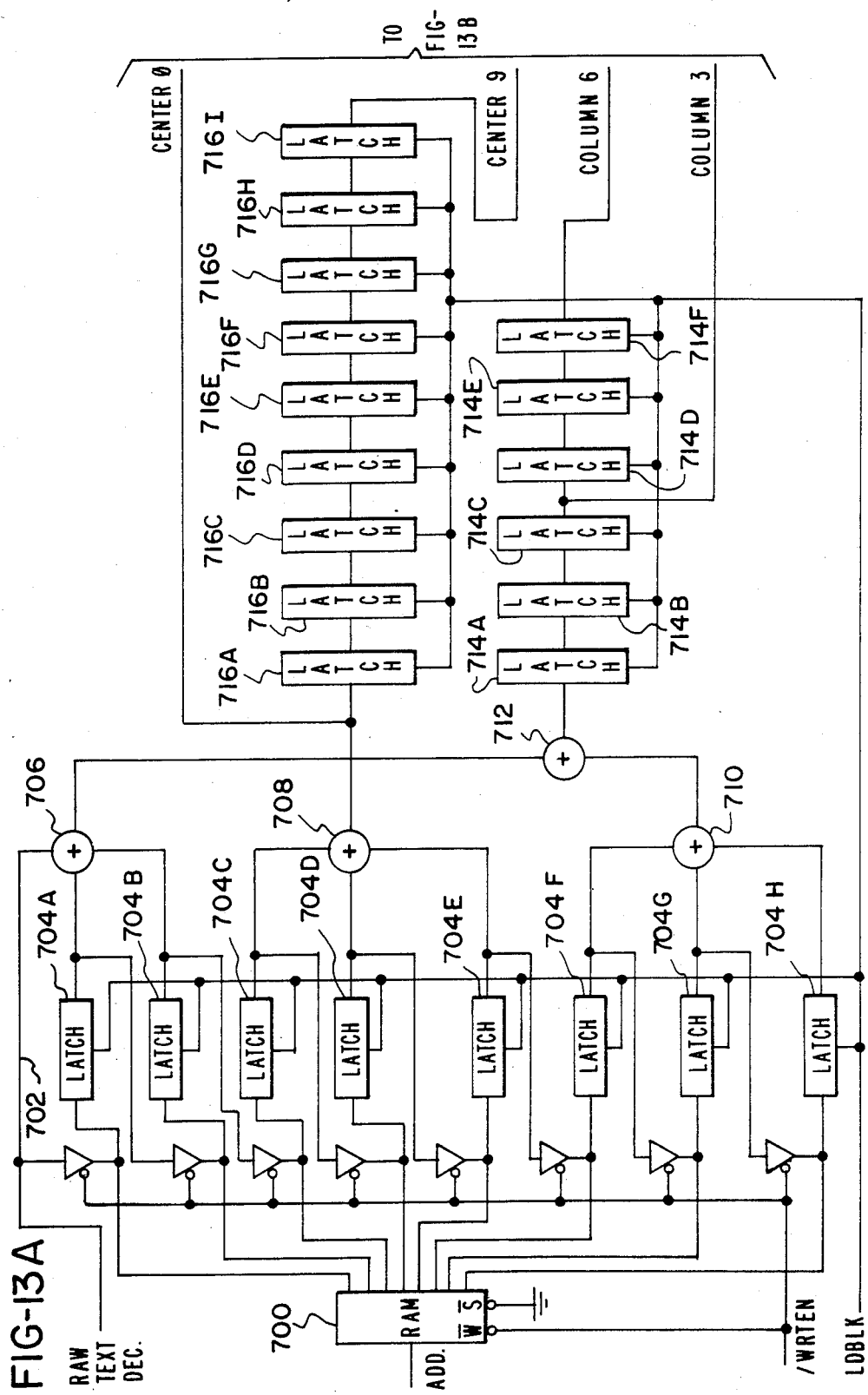
FIGS. 13A and 13B together from a block diagram for an implementation of the second decision filter.
Figure 13B:
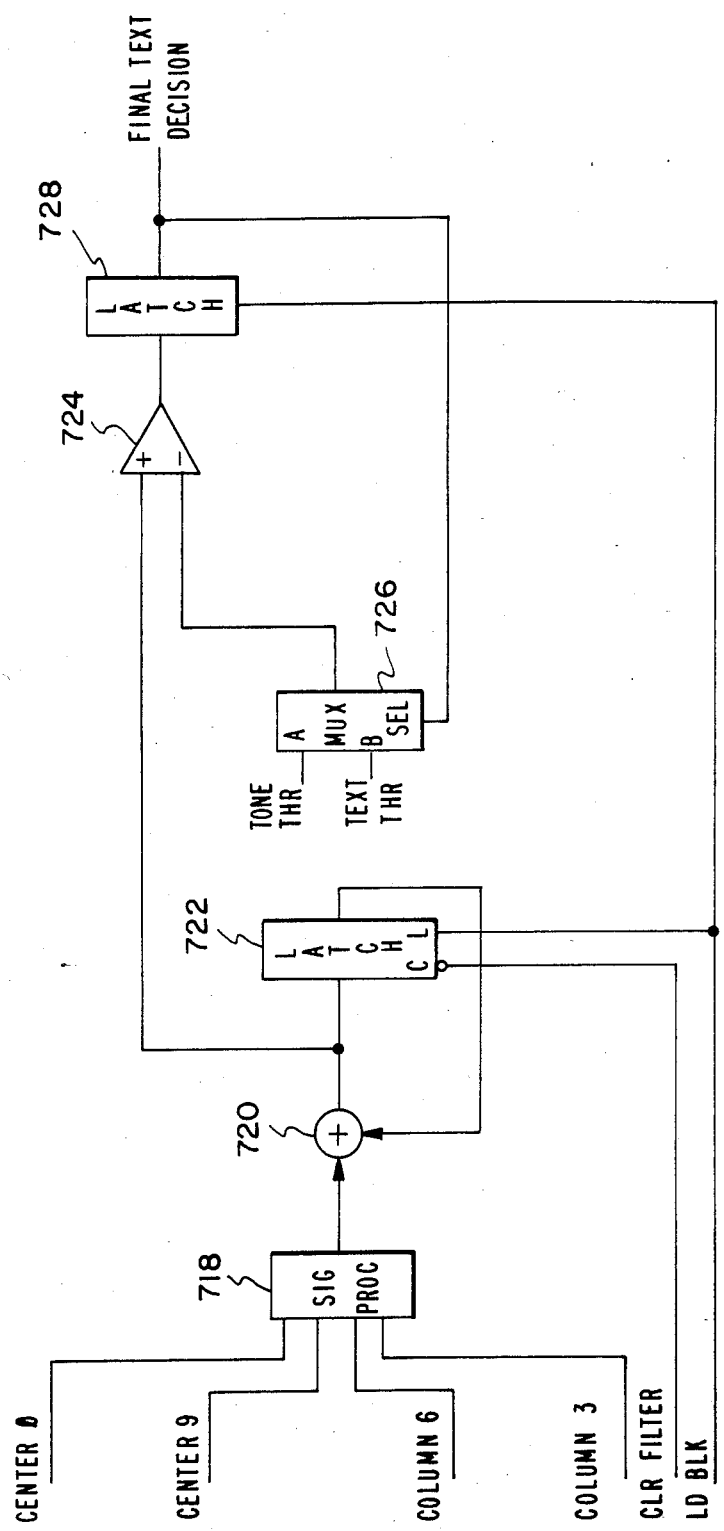

A block diagram for an implementation of the second decision filter is shown in FIGS. 13A and 13B. The input section of the second decision filter shown in FIG. 13A is similar in operation to the input section of the first decision filter shown in FIG. 11. A random access memory (RAM) 700 is utilized to store the raw text decision signals for the preceding 8 scan rows of image data blocks, such that when the ninth row of data from the first decision filter is passed to the input 702 of the second decision filter, the corresponding column values of the preceding 8 scan lines are read from the RAM 700 and passed to latch circuits 704.

The input value on the conductor 702 is added to the contents of the first two latch circuits 704A and 704B by means of an adder circuit 706; the output signals from the latch circuits 704C–704E are added together by an adder circuit 708; and the output signals from the latch circuits 704F–704H are added together by an adder circuit 710. The output signals from the adder circuits 706 and 710 are passed to an adder circuit 712, the output signals from which are passed to a series of six latch circuits 714. The output signals from the adder circuit 708 are passed to a series of nine latch circuits 716 and to a signal processing circuit 718. The remaining inputs to the signal processing circuit 718 include the output signals from the latch circuit 714C, the output signals from the latch circuit 714F and the output signals from the latch circuit 716I.

The output signals from the adder circuit 708 are added to the output signals from the latch circuit 714C and the output signals from the latch circuits 714F and 716I are substracted from that sum by the signal processing circuit 718. The output signals from the signal processing circuit 718 are passed to an adder circuit 720, the output signals from which are stored into a latch circuit 722, the output signals of which are fed back into the adder circuit 720 to generate an accumulation of the sums for the second decision filter. The signal processing circuit 718 can be implemented as an adder circuit or in a variety of other circuit configurations. However, it is preferably implemented as a programmable read-only memory (PROM) which is addressed by the input signals applied thereto. Each possible combination of the input signals address a unique location within the PROM which contains the appropriate arithmetic combination of those signals.

Operation of the second decision filter can best be understood by reviewing the ten-by-ten matrix shown in FIG. 12. The matrix of FIG. 12 represents 100 image data blocks numbered 1 through 100. The values stored in the matrix are the raw text decision signals, i.e., 1 to 0, representative of the corresponding blocks. The first nine elements of the rows of the matrix will be applied to the block diagram second decision filter of FIGS. 13A and 13B to show the operation of the secnd decision filter.

The philosophy of the second decision filter is to initially calculate a sum for a given cross-shaped set of 45 blocks such as that outlined in FIG. 12 which corresponds to the filtering operation for the very center block 46. Appropriate blocks are then subtracted from and added to that sum to arrive at the sum for the cross-shaped set of 45 blocks adjacent to it. That is, a sum is established which corresponds to block 46 of the cross-shaped set of blocks outlined in FIG. 12. To obtan a corresponding sum for the block 56, a difference value Δ is combined with the existing sum. That is, the raw text decision values of the shaded blocks 5,6,7,32,33,34,38,39 and 40 are subtracted from the sum and the raw text decision values of the shaded blocks 62,63,64,68,69,70,95,96,97 are added to the sum.

Thus, the difference value Δ needed to obtain the sum for the block 56 from the sum for the block 46 comprises the sum of the blocks 62,63,64,68,69,70,95,96, and 97 minus the sum of the blocks 5,6,7,32,33,34,38,39, and 40. For this operation, the latch circuit 722 contains the initial sum and the output signals from the signal processing circuit 718 define the difference value Δ to be added to or subtracted from the initial sum.

Since the latch circuits 714A–714F and 716A–716I must be loaded before a sum can be generated for a cross-shaped set of blocks, it will be presumed that the first eight have been applied to the circuit of FIG. 13A and are appropriately stored in the RAM 700. It will also be presumed that the latch circuits 714A–714F and 716A–716I are initially cleared.

Table I will facilitate an understanding of the operation of the second decision filter of FIGS. 13A and 13B. The raw text decision values, i.e., one or zero, from the first decision filter for the block numbers identified are: applied as input signals on the input 702; added to or subtracted from one another to generate signals to address the signal processing circuit 718; and added to one another to determine the input signals to the latch circuits 714 and 716. The output signal from the adder circuit 720 is accumulated by the latch circuit 722. It is noted that the input signals to the latch circuits 714 and 716 are passed along the series of latch circuits to become available at the appropriate times indicated in Table I by the column entitled SIGNAL PROCESSING CIRCUIT 718.

TABLE I

| INPUT 702 | SIGNAL PROCESSING CIRCUIT 718 | LATCHES 716 | LATCHES 714 |
|---|---|---|---|
| 9 | 4,5,6 | 4,5,6 | 1,2,3,7,8,9 |
| 19 | 14,15,16 | 14,15,16 | 11,12,13,17,18,19 |
| 29 | 24,25,26 | 24,25,26 | 21,22,23,27,28,29 |
| 39 | 34,35,36 | 34,35,36 | 31,32,33,37,38,39 |
| 49 | 44,45,46 +[1,2,3,7,8,9] +[11,12,13,17,18,19] | 44,45,46 | 41,42,43,47,48,49 |
| 59 | 54,55,56 +[21,22,23,27,28,29] | 45,55,56 | 41,52,53,57,58,59 |
| 69 | 64,65,66 +[31,32,33,37,38,39] −[1,2,3,7,8,9] | 64,65,66 | 61,62,63,67,68,69 |
| 79 | 74,75,76 +[41,42,43,47,48,49] −[11,12,13,17,18,19] | 74,75,76 | 71,72,73,77,78,79 |
| 89 | 84,85,86 +[51,52,53,57,58,59] −[21,22,23,27,28,29] | 84,85,86 | 81,82,83,87,88,89 |
| 10 | 5,6,7 +[61,62,63,67,68,69] −[31,32,33,37,38,39] −[4,5,6] | 5,6,7 | 2,3,4,8,9,10 |
| 20 | 15,16,17 +[71,72,73,77,78,79] −[41,42,43,47,48,49] −[14,15,16] | 15,16,17 | 12,13,14,18,19,20 |
| 30 | 25,26,27 +[81,82,83,87,88,89] −[51,52,53,57,58,59] −[24,25,26] | 25,26,27 | 22,23,24,28,29,30 |
| 40 | 35,36,37 +[2,3,4,8,9,10] −[61,62,63,67,68,69] −[34,35,36] | 35,36,37 | 32,33,34,38,39,40 |
| 50 | 45,46,47 +[12,13,14,18,19,20] −[71,72,73,77,78,79] −[44,45,46] | 45,46,47 | 42,43,44,48,49,50 |
| 60 | 55,56,57 +[22,23,24,28,29,30] −[81,82,83,87,88,89] −[54,55,56] | 55,56,57 | 52,53,54,58,59,60 |
| 70 | 65,66,67 +[32,33,34,38,39,40] −[2,3,4,8,9,10] −[64,65,66] | 65,66,67 | 62,63,64,68,69,70 |
| 80 | 75,76,77 +[42,43,44,48,49,50] −[12,13,14,18,19,20] −[74,75,76] | 75,76,77 | 72,73,74,78,79,80 |
| 90 | 85,86,87 +[52,53,54,58,59,60] −[22,23,24,28,29,30] −[84,85,86] | 85,86,87 | 82,83,84,88,89,90 |

By accumulating the output signals from the signal processing circuit 718, the summation of the raw text decision values for the following blocks is obtained during the input of the raw text decision value for the block 90:

5,6,7,15,16,17,25,26,27,35,36,37,45,46,47,55,56,57,65,66,67,32,33,34,38,39,40,75,76,77,42,43,44,48,49,50,85,86,87,52,53,54,58,59,60

As will be noted, these blocks are the blocks within the cross-shaped outlined area of 45 blocks shown in FIG. 12.

Thus, by applying the raw decision block values of the blocks of row 9 and row 10 of the matrix of FIG. 12 under the above presumed conditions, it can be seen that after the raw decision value for block 90 has been applied to the second decision filter, the sum of the values corresponding to the image data blocks within the cross-shaped outlined area of FIG. 12 have been added together. When this value is available as the output signal of the adder circuit 720, it also is applied to the positive input of a comparator circuit 724 which receives a threshold value from a multiplexer circuit 726 on its negative input. The appropriate threshold, i.e., text or continuous tone, is selected by the output of a latch circuit 728 which receives the signal from the comparator circuit 724 indicating whether the center block, i.e., block 46 in the cross-shaped area of FIG. 12, is finally classified as text or continuous tone.

It will be apparent to those skilled in the art that a variety of circuitry can be utilized to generate the control signals for processing grayscale image data as described herein to identify text data and continuous tone data. Preferably, the control signals are generated by a state machine, such as the one which controls the image decision processor of the present invention. The preceeding disclosure will permit one skilled in the art of controller design to readily implement a system for generating such control signals regardless of the circuits chosen to implement the present invention or included within the equipment utilizing the present invention.

Figure 14:
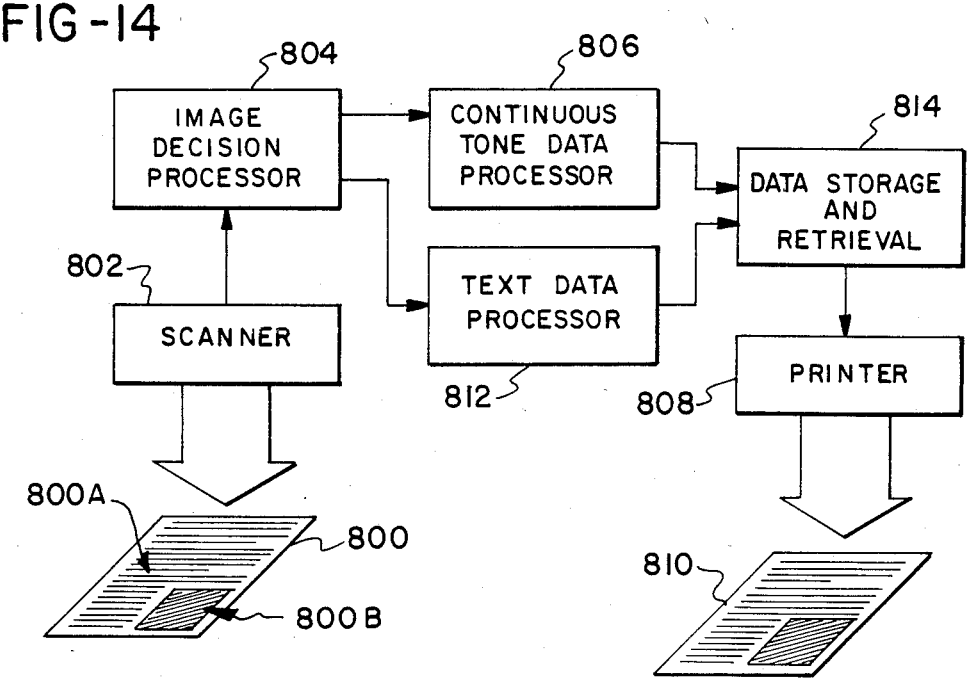
FIG. 14 is a block diagram of a document duplicator system.

While the present invention is generally applicable to processing image data, it is particularly applicable to a document duplicator system as shown in FIG. 14. In such a system, a document 800 to be duplicated is scanned by a document scanner 802 which may comprise any commercial available CCD array, for example, a CCD 151 scanning array sold by Fairchild Camera & Instrument Corporation. Scanner 802 includes an analog-to-digital converter which converts each pel of the document 800 into a grayscale value ranging between white and black, for example, grayscale value 0 and grayscale value 15, respectively, if 16 grayscale values are used.

The grayscale image data is passed from the scanner 802 to the image decision processor 804 in accordance with the present invention which determines whether the data corresponds to text 800A or continuous tone 800B portions of the document 800.

Continuous tone image data is passed to a continuous tone data processor 806 which determines which pels should be printed by a printer 808 to generate a copy 810 which duplicates continuous tone portions of the document 800. A variety of processing techniques can be applied to the continuous tone data. For example, various pixel block patterns can be selected to represent the data. Also, the block patterns may be shifted, rotated or otherwise varied to prevent the appearance of interference patterns. Since these techniques are not a part of the present invention, they will not be further described herein.

In the grayscale image data representative of text 800A portions of the document 800 are passed to a text processor 812. The text data may be processed, for example, by comparison to an adaptive threshold to determine which pixel should be printed by the printer 808 to duplicate text portions of the document 800. If the grayscale values of the text image data exceed the adaptive threshold, the corresponding pixels are printed; if they do not exceed the threshold, they are not printed. A suitable text data processor is fully disclosed in the U.S. patent application entitled "Adaptive Threshold Document Duplication" which was filed on even date herewith, is assigned to the same assignee as the present application and is incorporated herein by reference.

Data from the continuous tone data processor 806 and the text data processor 812 are passed to a data storage and retrieval circuit 814. While the data storage and retrieval circuit 814 forms no part of the present invention, an applicable circuit is disclosed in U.S. patent application Ser. No. 355,781, which was filed by Bobick et al, on Mar. 8, 1982, and is assigned to the same assignee as the present application. Data within the data storage and retrieval circuit 814 are then passed to the printer 808 to print a copy 810 which duplicates the document 800. The printer 808 is preferably a jet drop printer of the type disclosed in Paranjpe, U.S. Pat. No. 4,085,409, but any convenient binary marking apparatus could be used.

While the method herein described and the form of apparatus for carrying this method into effect constitute preferred embodiments of this invention, it is to be understood that the invention is not limited to this precise method and form of apparatus and that changes may be made in either without departing from the scope of the invention which is defined in the appended claims.

What is claimed is:

1. A method for determining whether portions of an image represented by image data obtained by scanning said image correspond to text or continuous tone, said method comprising the steps of:

partitioning said image data into contiguous image data blocks;

determining an average grayscale value for each of said image data blocks;

determining at least one additional characteristic for each of said image data blocks;

utilizing each possible average grayscale value as an indexing variable;

generating a one dimensional Gaussian distribution to distribute said at least one additional characteristic for each of said average grayscale values for text data;

determining the mean and standard deviation for each text data distribution;

calculating the Mahalanobis distance for each additional characteristic data value for each image data block to determine a measure of the distance from the mean for that characteristic of the corresponding data block and, hence, a representative text probability of whether said data block corresponds to a text portion of said image; and determining whether said data blocks correspond to text or continuous tone portions of said image based on said representative text probabilities.

2. A method as claimed in claim 1 further comprising the steps of:

generating a one dimensional Gaussian distribution to distribute said at least one additional characteristic for each of said average grayscale values for continuous tone data;

determining the mean and standard deviation for each continuous tone data distribution; and calculating the Mahalanobis distance for each additional characteristic data value for each image data block to determine a measure of the distance from the mean for that characteristic of the corresponding data block and, hence, a representative continuous tone probability of whether said data block corresponds to a continuous tone portion of said image wherein the step of determining whether said data blocks correspond to text or continuous tone portions of said image is based on said representative text and continuous tone probabilities.

3. A method as claimed in claim 2 wherein the step of determining whether said data blocks correspond to text or continuous tone portions of said image based on said representative text and continuous tone probabilities comprises normalizing the text probability by dividing it by the sum of the two probabilities and using the normalized probability to make the determination.

4. A method as claimed in claim 3 further comprising the step of applying said normalized text probability to a first decision filter to update said normalized text probability based on the normalized text probabilities of the surrounding contiguous data blocks prior to determining whether said data blocks correspond to text or continuous tone portions of said image.

5. A method as claimed in claim 4 further comprising the step of applying the output signals from said first decision filter to a second decision filter to finally determine whether said data blocks correspond to text or continuous tone portions of said image, said second decision filter evaluating the text/continuous tone decisions for 45 data blocks comprising a cross-shaped outline of data blocks including a centered three-by-three matrix of data blocks and the immediately adjacent three-by-three matrices of data blocks to the top, bottom and sides thereof, the preceeding text/continuous tone decisions being summed and compared to a predetermined threshold to finally determine whether the center data block of the centered three-by-three matrix of data blocks corresponds to a text portion or a continuous tone portion of said image.

6. A method as claimed in claim 3 wherein said at least one additional characteristic comprises a block variance.

7. A method as claimed in claim 6 further comprising the step of determining a block edge count for each of said image data blocks as a second additional characteristic.

8. A method as claimed in claim 7 further comprising the step of determining a block agreement count for each of said image data blocks as a third additional characteristic.

9. A method as claimed in claim 8 further comprising the step of determining a block text average for each of said image data blocks as a fourth additional characteristic.

10. A method for duplicating a document wherein grayscale image data is separated into text data and continuous tone data such that it can be suitably processed for use in a bilevel printing device, said method comprising the steps of:
   scanning a document to generate grayscale image data representative of individual pels of said document;
   partitioning said image data into contiguous image data blocks;
   determining an average grayscale value for each of said image data blocks;
   determining at least one additional characteristic for each of said image data blocks;
   utilizing each possible average grayscale value as an indexing variable;
   generating a one dimensional Gaussian distribution to distribute said at least one additional characteristic for each of said average grayscale values for text data;
   determining the mean and standard deviation for each text data distribution;
   calculating the Mahalanobis distance for each additional characteristic data value for each image data block to determine a measure of the distance from the mean for that characteristic of the corresponding data block and, hence, a representative text probability of whether said data block corresponds to a text portion of said image;
   determining whether said data blocks correspond to text image data or continuous tone portions of said image based on said representative text probabilities;
   processing said grayscale image data as either text image data or continuous tone image data to generate binary image data; and
   printing a duplicate of said document based on said binary image data.

11. A method as claimed in claim 10 further comprising the steps of:
   generating a one dimensional Gaussian distribution to distribute said at least one additional characteristic for each of said average grayscale values for continuous tone data;
   determining the mean and standard deviation for each continuous tone data distribution; and
   calculating the Mahalanobis distance for each additional characteristic data value for each image data block to determine a measure of the distance from the mean for that characteristic of the corresponding data block and, hence, a representative continuous tone probability of whether said data block corresponds to a continuous tone portion of said image wherein the step of determining whether said data blocks correspond to text or continuous tone portions of said image is based on said representative text and continuous tone probabilities.

12. A method as claimed in claim 11 wherein the step of determining whether said data blocks correspond to text or continuous tone portions of said image based on said representative text and continuous tone probabilities comprises normalizing the text probability by dividing it by the sum of the two probabilities and using the normalized probability to make the determination.

13. A method as claimed in claim 12 further comprising the step of applying said normalized text probability to a first decision filter to update said normalized text probability based on the normalized text probabilities of the surrounding contiguous data blocks prior to determining whether said data blocks correspond to text or continuous tone portions of said image.

14. A method as claimed in claim 13 further comprising the step of applying the output signals from said first decision filter to a second decision filter to finally determine whether said data blocks correspond to text or continuous tone portions of said image, said second decision filter evaluating the text/continuous tone decisions for 45 data blocks comprising a cross-shaped outline of data blocks including a centered three-by-three matrix of data blocks and the immediately adjacent three-by-three matrices of data blocks to the top, bottom and sides thereof, the preceeding text/continuous tone decisions being summed and compared to a predetermined threshold to finally determine whether the center data block of the centered three-by-three matrix of data blocks corresponds to a text portion of a continuous tone portion of said image.

15. A method as claimed in claim 12 wherein said at least one additional characteristic comprises a block variance.

16. A method as claimed in claim 15 further comprising the step of determining a block edge count for each of said image data blocks as a second additional characteristic.

17. A method as claimed in claim 16 further comprising the step of determining a block agreement count for each of said image data blocks as a third additional characteristic.

18. A method as claimed in claim 17 further comprising the step of determining a block text average for each of said image data blocks as a fourth additional characteristic.

19. Apparatus for determining whether portions of an image represented by image data obtained by scanning said image correspond to text or continuous tone, said apparatus comprising:
   first circuit means for partitioning said image data into contiguous image data blocks;
   second circuit means for determining an average grayscale value for each of said image data blocks in response to the image data comprising said image data blocks;
   third circuit means for determining at least one additional characteristic for each of said image data blocks in response to image data comprising said image data blocks;

probability generating means responsive to said average grayscale value and said at least one additional characteristic for generating a normalized text probability based on the Mahalanobis distance of each additional characteristic data value distributed as a one dimensional Gaussian distribution for each of said average grayscale values; and fourth circuit means for determining whether said data blocks correspond to text or continuous tone portions of said image based on said normalized text probabilities.

20. Apparatus as claimed in claim 19 wherein said fourth circuit means comprises first decision filter circuit means for updating said normalized text probabilities based on the normalized text probabilities of the surrounding contiguous data blocks and second decision filter circuit means for finally determining whether said data blocks correspond to text or continuous tone portions of said image by processing the output signals from said first decision filter for 45 data blocks comprising a cross-shaped outline of data blocks including a centered three-by-three matrix of data blocks and the immediately adjacent three-by-three matrices of data blocks to the top, bottom and sides thereof, the preceeding text/continuous tone decisions from said first decision filter being summed and compared to a predetermined threshold to finally determine whether the center data block of the centered three-by-three matrix of data blocks corresponds to a text portion or a continuous tone portion of said image.

* * * * *